（12）United States Patent
Ono et al.

(10) Patent No.: US 11,177,741 B2
(45) Date of Patent: Nov. 16, 2021

(54) AC-AC CONVERTER CIRCUIT

(71) Applicant: NABTESCO CORPORATION, Tokyo (JP)

(72) Inventors: Yasuo Ono, Tokyo (JP); Kazuhito Nakamura, Tokyo (JP); Michael Haider, Zurich (CH); Dominik Bortis, Zurich (CH); Johann W. Kolar, Zurich (CH)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 16/846,866

(22) Filed: Apr. 13, 2020

(65) Prior Publication Data

US 2020/0244177 A1    Jul. 30, 2020

Related U.S. Application Data

(63) Continuation of application No. PCT/JP2018/037260, filed on Oct. 4, 2018.

(30) Foreign Application Priority Data

Oct. 13, 2017  (JP) .............................. JP2017-199588
Oct. 30, 2017  (JP) .............................. JP2017-209407

(51) Int. Cl.
  *H02M 5/458*   (2006.01)
  *H02M 1/42*    (2007.01)
  *H02P 27/08*   (2006.01)
(52) U.S. Cl.
  CPC .......... *H02M 5/4585* (2013.01); *H02P 27/08* (2013.01); *H02M 1/425* (2013.01); *H02M 1/4208* (2013.01)

(58) Field of Classification Search
  CPC .... H02M 1/4208; H02M 1/425; H02M 5/458; H02M 5/4585
  USPC ....................................... 363/35–37
  See application file for complete search history.

(56) References Cited

U.S. PATENT DOCUMENTS

| 1,998,325 A | * | 4/1935 | Lyman, Jr. ........... H04B 15/005 333/181 |
| 5,726,550 A | * | 3/1998 | Inaniwa ................. B04B 9/10 318/269 |
| 5,764,496 A | * | 6/1998 | Sato ...................... H02M 1/425 363/37 |

(Continued)

FOREIGN PATENT DOCUMENTS

| JP | 2006186950 A | 7/2006 |
| JP | 2010119174 A | 5/2010 |

(Continued)

OTHER PUBLICATIONS

International Preliminary Report on Patentablity for International Application No. PCT/JP2018/037260; dated Apr. 14, 2020 with Written Opinion of the International Searching Authority; dated Dec. 25, 2018.

(Continued)

*Primary Examiner* — Gary A Nash
(74) *Attorney, Agent, or Firm* — Cantor Colburn LLP

(57) ABSTRACT

An AC-AC converter circuit converts an AC voltage into a further AC voltage. A rectifier circuit rectifies the AC voltage. An inverter circuit generates the further AC voltage. AZ source circuit is provided between the rectifier circuit and the inverter circuit.

7 Claims, 19 Drawing Sheets

(56) References Cited

U.S. PATENT DOCUMENTS

| | | | | |
|---|---|---|---|---|
| 7,130,205 | B2 * | 10/2006 | Peng | H02M 7/48 363/140 |
| 8,026,691 | B2 * | 9/2011 | Nagashima | B60L 58/40 318/801 |
| 2003/0231518 | A1 | 12/2003 | Peng | |
| 2010/0073969 | A1 * | 3/2010 | Rajagopalan | H02M 5/458 363/37 |
| 2012/0081081 | A1 * | 4/2012 | Walters | H05B 31/50 320/163 |
| 2014/0009096 | A1 * | 1/2014 | Imanaka | H02M 5/458 318/494 |
| 2015/0222114 | A1 * | 8/2015 | Harper | H02H 9/005 361/91.5 |
| 2016/0294300 | A1 * | 10/2016 | Sakakibara | H02M 7/48 |

FOREIGN PATENT DOCUMENTS

| | | | |
|---|---|---|---|
| JP | 2013048516 | A | 3/2013 |
| JP | 201652167 | A | 4/2016 |
| JP | 2016052167 | A | 4/2016 |

OTHER PUBLICATIONS

International Search Report corresponding to Application No. PCT/JP2018/037260; dated Dec. 25, 2018.

JPO Office Action for corresponding JP Application No. 2019-548167, dated Jun. 9, 2020.

Zhang et al., "Design of a Robust Grid Interface System for PMSG-Based Wind Turbine Generators," IEEE Transactions on Industrial Electronics, vol. 58, No. 1,(Dated Jan. 2011) pp. 316-328.

EPO Extended European Search Report for corresponding EP Application No. 18866692.9; dated May 31, 2021.

Poursmaeil et al., "Small Signal Modeling, Analysis and Control of T-Z-Source Inverter," 2017 25th Iranian Conference on Electrical Engineering, (Dated 2017), pp. 1216-1222.

Qian et al., "Trans-Z-Source Inverters", The 2010 International Power Electronics Conference, IPEC-SAPPORO 2010 [ECCE ASIA}; Sapporo, Japan, IEEE, Piscataway NJ, USA, Jun. 21, 2010; pp. 1874-1881.

KR Notification of Reasons for Refusal for corresponding KR Patent Application No. 10-2020-7013239; dated Jul. 22, 2021.

* cited by examiner

AC-AC CONVERTER CIRCUIT

CROSS REFERENCE TO RELATED APPLICATIONS

This application is a continuation under 35 U.S.C. § 120 of PCT/JP2018/037260, filed Oct. 4, 2018, which is incorporated herein reference and which claimed priority to Japanese Application No. 2017-199588, filed Oct. 13, 2017. The present application likewise claims priority under 35 U.S.C. § 119 to Japanese Application No. 2017-209407, filed Oct. 30, 2017, the entire content of which is also incorporated herein by reference.

BACKGROUND OF THE INVENTION

1. Field of the Invention

The present invention relates to an AC-AC converter circuit adapted to convert a power from an AC power source into an AC power.

2. Description of the Related Art

Inverters for outputting a three-phase AC power from a DC power source are known. For example, patent literature 1 discloses a power conversion circuit comprised of a combination of an impedance source circuit and a three-phase inverter. The power conversion circuit disclosed in patent literature 1 feeds a DC power from a secondary battery (storage battery) to a three-phase inverter via an impedance source circuit to generate an AC power. In particular, the power conversion circuit uses a normally-on transistor as a switching element. Further, patent literature 2 discloses a power converter including a power source, a main converter circuit, and an impedance network. In this power converter, the impedance network is coupled to the power source and the main power converter circuit, and the main power converter circuit is coupled to a load. The impedance network is configured such that the main converter circuit perform both buck conversion and boost conversion. However, a function for power factor correction (PFC) is not provided.
[Patent Literature 1] JP2010-119174
[Patent Literature 2] U.S. Pat. No. 7,130,205

SUMMARY OF THE INVENTION

We have studied AC-AC converter circuits for converting a power from an AC power source into an AC power and gained the following knowledge.

An AC-AC converter circuit may be used to drive a motor driven by a three-phase AC power, by means of a single-phase AC power source. The AC-AC converter circuit may be configured to include a rectifier circuit for converting a power from an AC power source into a DC power and a DC-AC converter circuit for converting the rectified DC power into an AC power of a desired specification.

However, the rectified voltage obtained from a single-phase AC voltage particularly contains a large pulsation. For this reason, the rectifier circuit is often provided with a PFC circuit in which a large-capacity smoothing capacitor is used. The larger the capacity or the withstand voltage of a capacitor is, the larger the size thereof may be. A disadvantage of carrying a large-capacitor is that the size of the AC-AC converter circuit as a whole is increased. Another disadvantage with a rectifier circuit having a large-capacity capacitor is that a power source current that contains many harmonics flows.

In this background, we have realized that there is an issue that should be addressed for improvement in AC-AC converter circuits from the perspective of reducing the size of the circuit as a whole and reducing harmonics in the power source current.

Such an issue could also arise in other types of AC-AC converter circuits as well as single-phase to three-phase AC-AC converter circuits.

The present invention addresses the above-described issue, and a general purpose thereof is to provide an AC-AC converter circuit that can be reduced in size as a whole.

An embodiment of the present invention relates to an AC-AC converter circuit adapted to convert an AC voltage into a further AC voltage, wherein a Z source circuit is provided between a rectifier circuit that rectifies the AC voltage and an inverter circuit that generates the further AC voltage.

Optional combinations of the aforementioned constituting elements, and replacement of constituting elements or implementation of the present invention in the form of methods, devices, programs, transitory or non-transitory recording mediums storing programs, systems, etc. may also be practiced as optional modes of the present invention.

BRIEF DESCRIPTION OF THE DRAWINGS

FIG. 13A shows an example of the T source circuit, and FIG. 13B shows an example of the Γ source circuit;

FIG. 18A shows an operation mode occurring when $k=k_1<1$, and FIG. 18B shows an operation mode occurring when $k=k_2>1$;

FIG. 20A shows the carrier signal of the converter according to the comparative example, and FIG. 20B shows the U-phase voltage waveform of the converter according to the comparative example;

FIG. 21A shows the carrier signal of the converter according to method 1, and FIG. 21B shows the U-phase voltage waveform of the converter according to method 1; FIG. 22A shows a carrier signal of the converter according to method 2, and FIG. 22B shows a U-phase voltage waveform of the converter according to method 2.

DETAILED DESCRIPTION OF THE INVENTION

Figure 1:
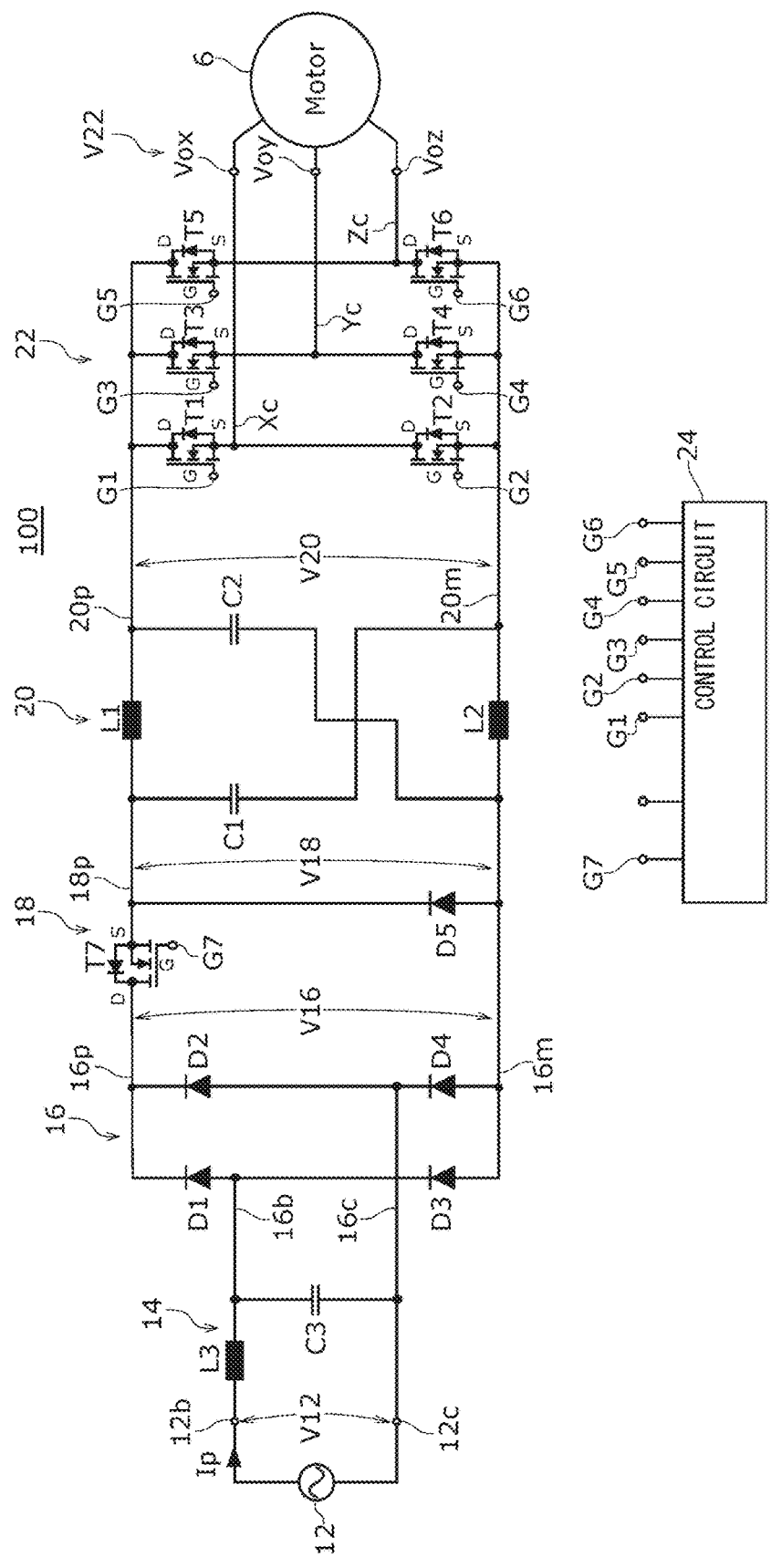
FIG. 1 is a circuit diagram showing an example of an AC-AC converter circuit according to the embodiment.

The invention will now be described by reference to the preferred embodiments. This does not intend to limit the scope of the present invention, but to exemplify the invention.

In the embodiment described in the following, the same constituting elements shall be denoted by the same reference numerals, and duplicative explanations will be omitted. For convenience of the description, some of the constituting elements are omitted as needed in the drawings.

FIG. 1 is a circuit diagram showing an example of an AC-AC converter circuit 100 according to the embodiment of the present invention. The AC-AC converter circuit 100 functions as a power converter that generates a three-phase power based on the power from a single-phase power source 12. By way of example, the AC-AC converter circuit 100 can be used to drive a variety of apparatuses including a pump, a compressor, an electric actuator of a ship or aircraft, a robot arm, etc. The AC-AC converter circuit 100 includes a filter 14, a rectifier circuit 16, a step-down circuit 18, a Z source circuit 20, a three-phase inverter circuit 22, and a control circuit 24. In this specification, the upstream side along the flow of power from the single-phase power source 12 to the output of three-phase power may be denoted as a preceding stage or an input, and the downstream side may be denoted as a subsequent stage or an output.

The single-phase power source 12 may be, for example, a commercial power source or a power generator. The single-phase power source 12 outputs an AC voltage V12 to a first end 12b and a second end 12c. The filter 14 is coupled between the single-phase power source 12 and the rectifier circuit 16 and functions as an EMI filter. The filter 14 includes an inductor L3 and a capacitor C3. The input end of the inductor L3 is connected to the first end 12b of the single-phase power source 12, and the output end of the inductor L3 is connected to the input end of the rectifier circuit 16. One end of the capacitor C3 is connected to the output end of the inductor L3, and the other end of the capacitor C3 is connected to the second end 12c of the single-phase power source 12.

The rectifier circuit 16 is connected in a stage subsequent to the filter 14. The rectifier circuit 16 includes four diodes D1-D4 in a bridge connection. The AC voltage V12 from the single-phase power source 12 is input to the input ends 16b, 16c of the rectifier circuit 16 via the filter 14. The rectifier circuit 16 subjects the AC voltage V12 from the single-phase power source 12 to full-wave rectification to generate a rectified voltage V16. The rectifier circuit 16 outputs the rectified voltage V16 between an output end 16p on the positive side and an output end 16m on the negative side. The waveform of the rectified voltage 16v is a pulsating waveform including a large peak and a large dip.

The step-down circuit 18 is connected in a stage subsequent to the rectifier circuit 16. The step-down circuit 18 steps down the rectified voltage V16 from the rectifier circuit 16 to generate a stepped-down voltage V18. The step-down circuit 18 includes a switching element T7 and a diode D5 connected to the output end of the switching element T7. The switching element T7 may be any of various publicly known elements. In this example, the switching element T7 is an n-type MOSFET. The drain of the switching element T7 is connected to the output end 16p on the positive side of the rectifier circuit 16, the source of the switching element T7 is connected to an output end 18p on the positive end of the step-down circuit 18, and the gate of the switching element T7 is connected to the control circuit 24. The cathode of the diode D5 is connected to the output end 18p, and the anode of the diode D5 is connected to the output end 16m of the rectifier circuit 16.

The Z source circuit 20 is connected in a stage subsequent to the step-down circuit 18. The Z source circuit 20 generates a supply voltage V20 supplied to the inverter circuit 22 based on the stepped-down voltage V18 from the step-down circuit 18. The Z source circuit 20 generates the supply voltage V20 from the rectified voltage V16 in accordance with a switching operation of the inverter circuit 22 and a switching operation of the step-down circuit. The Z source circuit 20 outputs the supply voltage V20 between the output end 20p on the positive side and the output end 20m on the negative side. The configuration of the Z source circuit 20 will be described later.

The inverter circuit 22 is connected in a stage subsequent to the Z source circuit 20. The inverter circuit 22 generates an AC voltage V22 based on the supply voltage V20 from the Z source circuit 20. In this example, the inverter circuit 22 is a three-phase inverter circuit. The AC voltage V22 is a three-phase AC voltage comprised of a voltage Vox in the X phase, a voltage Voy in the Y phase, and a voltage Voz in the Z phase. The voltages Vox, Voy, Voz may be voltages that alternate with a phase difference $2\pi/3$ from each other. The AC voltage V22 from the inverter circuit 22 is supplied to, for example, a motor 6. Any of various publicly known circuit configurations may be employed as the inverter circuit 22. In this example, the inverter circuit 22 is provided with six switching elements T1-T6. Each of the switching elements T1-T6 may be any of various public known elements. In this example, the switching elements T1-T6 are n-type MOSFETs.

The switching elements T1, T2 are mutually connected in series and form an X-phase arm. The switching elements T3, T4 are mutually connected in series and form a Y-phase arm. The switching elements T5, T6 are mutually connected in series and form a Z-phase arm. The drain of each of the switching elements T1, T3, T5 is connected to the output end 20p on the positive side of the Z source circuit 20 so that each of the switching elements T1, T3 T5 functions as an upper switching element. The source of each of the switching elements T2, T4, T6 is connected to the output end 20m on the negative side of the Z source circuit 20 so that each of the switching elements T2, T4, T6 functions as a lower switching element. The sources of the switching elements T1, T3, T5 are respectively connected to the drains of the switching elements T2, T4, T6 and output voltages Vox, Voy, Voz from the respective nodes Xc, Yc, Zc. The gates of the switching elements T1-T6 are connected to the control circuit 24. The switching elements T1-T6 of the inverter circuit 22 are subject to ON/OFF control by the control circuit 24.

The control circuit 24 controls the supply voltage V20 by controlling the gate voltage of the switching element T7. In particular, the control circuit 24 is configured to increase the supply voltage V20 by increasing the duty ratio of the on-state of the switching element T7 and decrease the supply voltage V20 by decreasing the duty ratio. The control circuit 24 controls the AC voltage V22 from the inverter circuit 22 by subjecting the switching elements T1-T6 to ON/OFF control. In particular, the control circuit 24 can control the voltages Vox, Voy, Voz from the respective arms of the inverter circuit 22 by controlling the gate voltages of the switching elements T1-T6. The configuration of the control circuit 24 will be described later.

Figure 2:
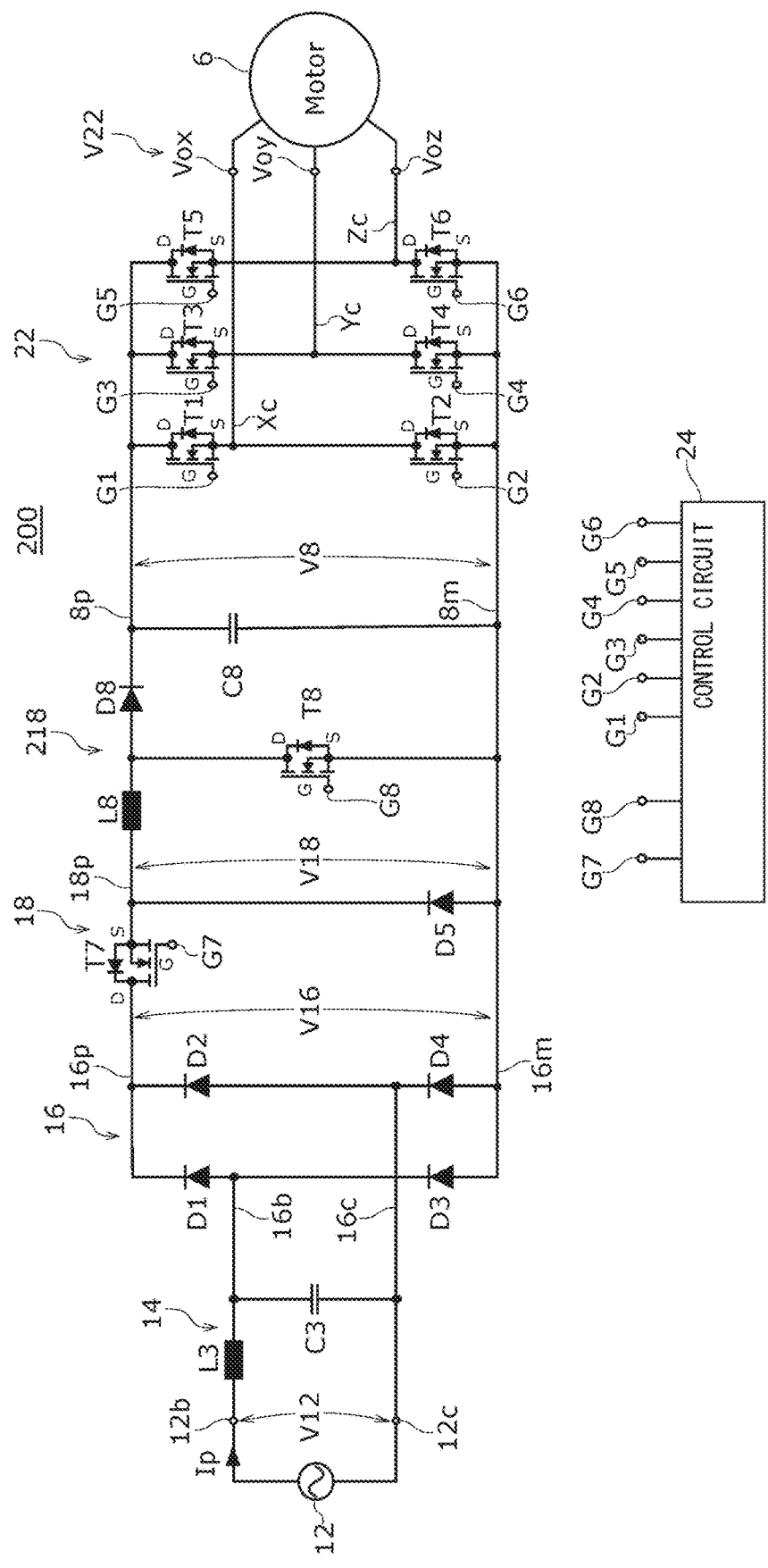
FIG. 2 is a circuit diagram showing an AC-AC converter circuit according to the comparative example.

Before describing the operation of the AC-AC converter circuit 100 according to the embodiment, a description will be given of the operation of the AC-AC converter circuit 200 according to a comparative example devised in the process of arriving at the present invention. FIG. 2 is a circuit diagram showing an AC-AC converter circuit 200 according to the comparative example. The AC-AC converter circuit 200 according to the comparative example is configured such that the Z source circuit 20 is removed from and a PFC circuit 218 and a smoothing capacitor C8 are added to the AC-AC converter circuit 100 according to the embodiment. A duplicative description is omitted, and the operation of the PFC circuit 218 and the smoothing capacitor C8 will mainly be described.

As shown in FIG. 2, the AC-AC converter circuit 200 includes the filter 14, the rectifier circuit 16, the step-down circuit 18, the PFC circuit 218, the smoothing capacitor C8, the inverter circuit 22, and the control circuit 24. The filter 14, the rectifier circuit 16, the step-down circuit 18, and the inverter circuit 22 are identical to those of the AC-AC converter circuit 100 so that a description thereof is omitted.

Figure 3:
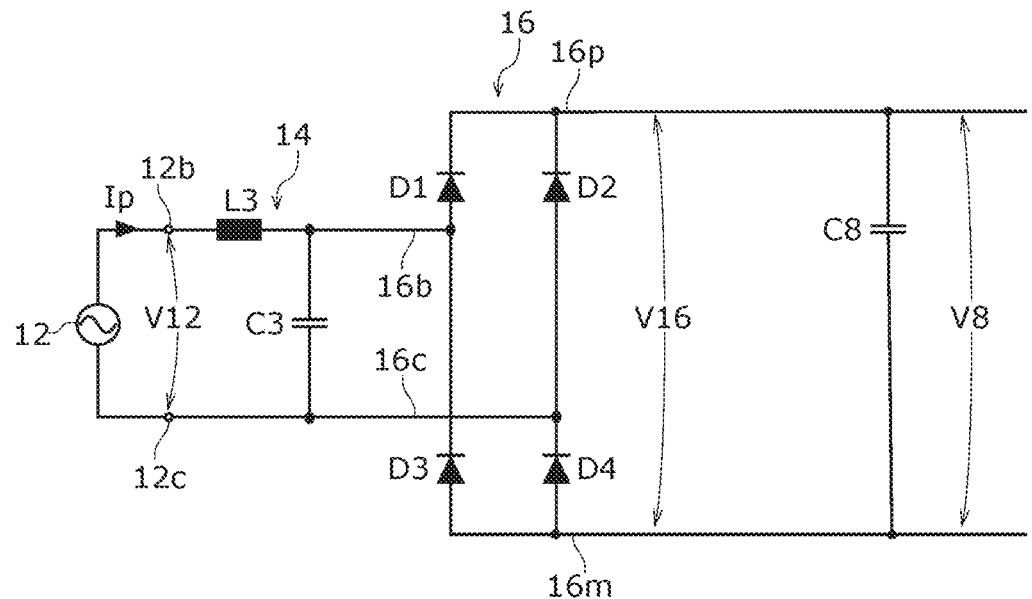
FIG. 3 is a circuit diagram for explaining the operation of the AC-AC converter circuit of FIG. 2.
Figure 4:
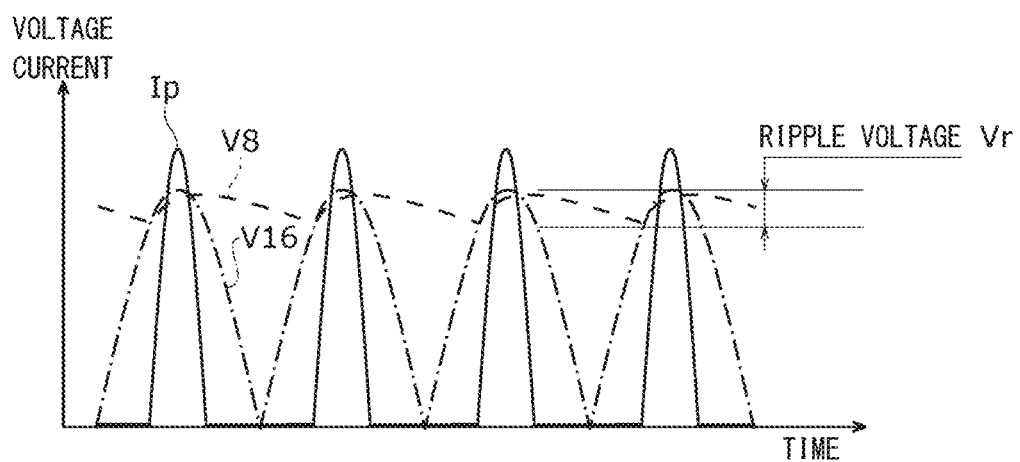
FIG. 4 is a waveform chart showing the waveform of a voltage and a current of the circuit of FIG. 3.

FIG. 3 is a circuit diagram for explaining the operation of the AC-AC converter circuit 200. FIG. 3 shows a circuit in which the step-down circuit 18 and the PFC circuit 218 are not provided. FIG. 4 is a waveform chart showing the waveform of a voltage and a current of the circuit of FIG. 3 (http://seppotl.web.fc2.com/zht03/acdc.html). FIG. 4 shows the rectified voltage V16, a smoothed voltage V8, and an input current Ip. The horizontal axis of FIG. 4 represents time. The vertical axis of FIG. 4 represents the magnitude of a voltage and a current. The rectified voltage V16 is a pre-smoothing waveform and is a pulsating waveform derived from merely subjecting a single-phase alternate current to full-wave rectification. The smoothed voltage V8 is a post-smoothing waveform and is a waveform in which pulsation is reduced. As shown in FIG. 4, the smoothed voltage V8 includes a ripple voltage Vr.

Figure 5:
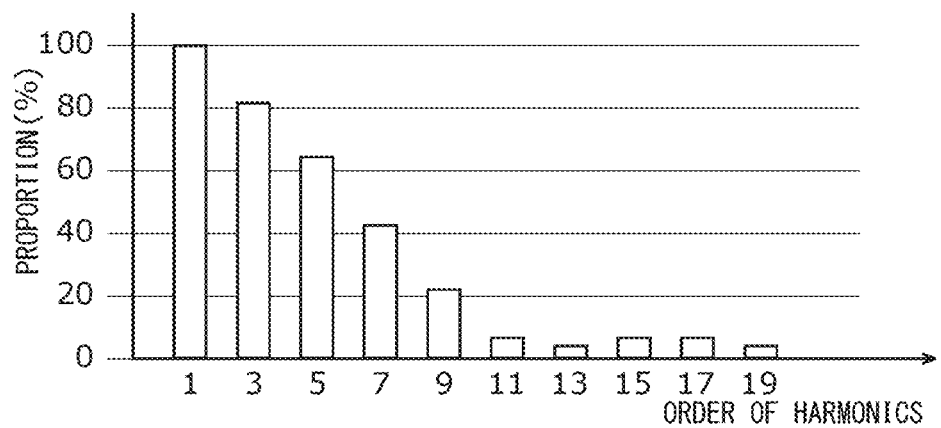
FIG. 5 is a graph showing high-order harmonics in the input current of the circuit of FIG. 3.

As shown in FIG. 4, the input current Ip flows only when the rectified voltage V16 exceeds the smoothed voltage V8 and so rises abruptly and drops abruptly. The duration in which the current does not flow is long. In this case, the power factor of the input current Ip is low and so is required to be improved. FIG. 5 is a graph showing harmonics obtained by analyzing frequencies of the input current Ip of FIG. 4 (http://www.jeea.or.jp/course/contents/01130/). The horizontal axis of FIG. 5 represents the order of harmonics. The vertical axis of FIG. 5 represents a proportion of the amplitude of each harmonic, with the amplitude of the fundamental wave (denoted as first order) being defined to be 100%. As shown in FIG. 5, the input current Ip contains many high-order harmonics. High-order harmonics cause unwanted radiation and so are desired to be suppressed.

In order to improve the power factor and suppress high-order harmonics, the AC-AC converter circuit 200 is provided with the PFC circuit 218. The PFC circuit 218 functions as a circuit for controlling the duration in which the input current flows to improve the power factor. The PFC circuit 218 suppresses high-order harmonics of the input current. The PFC circuit 218 shapes the rectified voltage V16 from the rectifier circuit 16 to generate a shaped voltage.

The smoothing capacitor C8 is connected in parallel in a stage subsequent to the PFC circuit 218. The smoothing capacitor C8 smooths the shaped voltage from the PFC circuit 218 to generate the smoothed voltage V8. It is desired that the smoothing capacitor C8 be provided with a capacitance commensurate with the magnitude of the charged and discharged current and a withstand voltage commensurate with the applied voltage. For this reason, the size of the smoothing capacitor C8 tends to be large.

Figure 6:
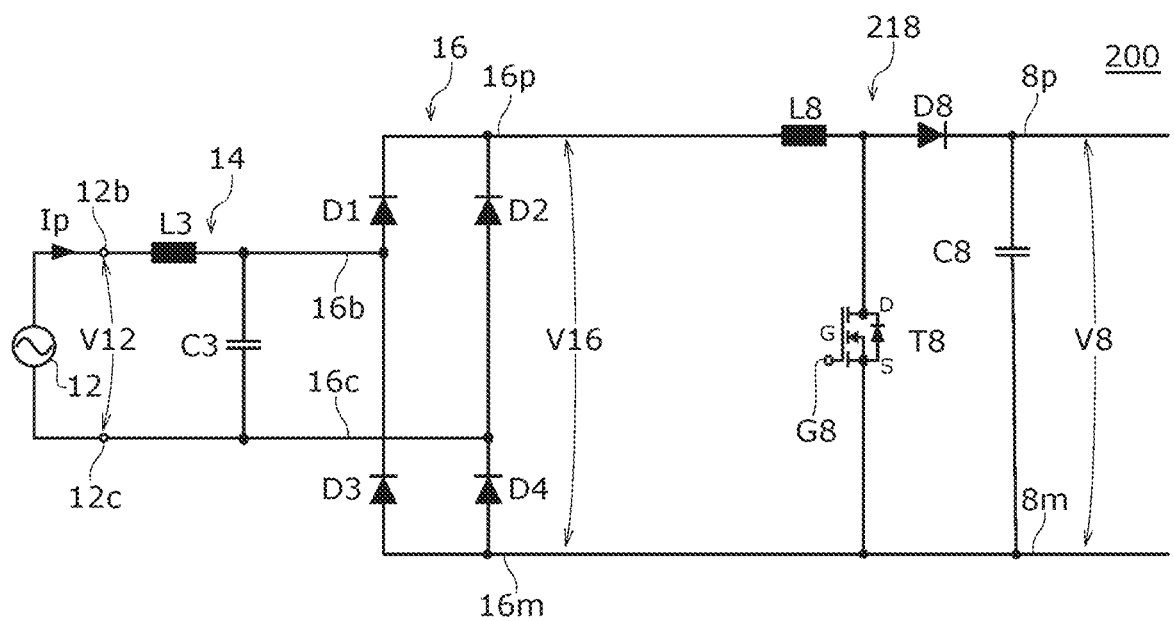
FIG. 6 is a circuit diagram for explaining the operation of the AC-AC converter circuit of FIG. 2.

FIG. 6 is a circuit diagram for explaining the operation of the PFC circuit 218 of the AC-AC converter circuit 200. FIG. 6 shows a circuit derived from adding the PFC circuit 218 to the circuit of FIG. 3. The PFC circuit 218 includes an inductor L8, a switching element T8, and a diode D8. The switching element T8 is an n-type MOSFET. The input end of the inductor L8 is connected to the output end 16p of the rectifier circuit 16. The drain of the switching element T8 is connected to the output end of the inductor L8, and the source of the switching element T8 is connected to the output end 16m of the rectifier circuit 16. The anode of the diode D8 is connected to the output end of the inductor L8, and the cathode of the diode D8 is connected to the positive end of the smoothing capacitor C8. The diode D8 is connected to prevent a back current from the smoothing capacitor C8.

The PFC circuit 218 inhibits an abrupt increase in the input current Ip by the action of the inductor L8. When the switching element T8 is on, the output end of the inductor L8 and the output end 16m on the negative side of the rectifier circuit 16 are short-circuited, and the short-circuit current flows in the inductor L8. When the switching element T8 is switched from on to off, the action of the inductor L8 increases the voltage at the output end of the inductor L8, inhibiting an abrupt decrease in the input current Ip. By operating in this way, the PFC circuit 218 can improve the power factor of the input current Ip and suppress high-order harmonics in the input current Ip.

Figure 7:
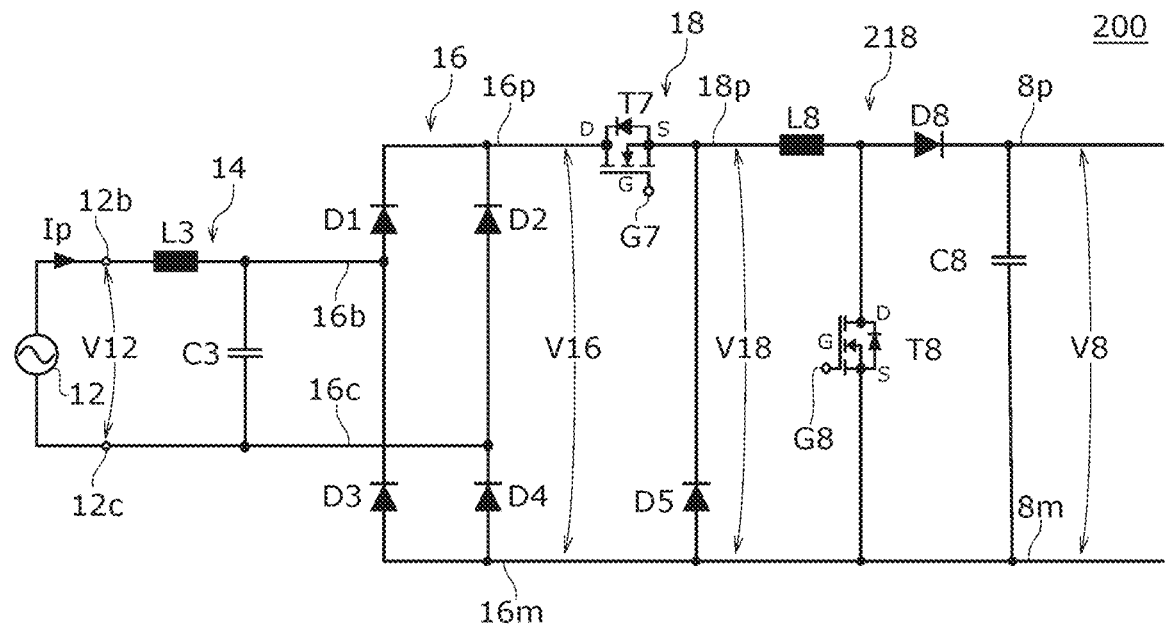
FIG. 7 is another circuit diagram for explaining the operation of the AC-AC converter circuit of FIG. 2.

If the converter circuit merely includes the PFC circuit 218, a low output from the inverter circuit 22 may result in a relatively larger proportion of the switching loss with respect to the output. To address the issue, the step-down circuit 18 is provided between the output side of the rectifier circuit 16 and the input side of the PFC circuit 218 in the AC-AC converter circuit 200. FIG. 7 is a circuit diagram for explaining the operation of the PFC circuit 218 combined with the step-down circuit 18.

As described above, the step-down circuit 18 includes the switching element T7 and the diode 5. When the switching element T7 is on, the smoothing capacitor C8 is charged via the switching element T7 and the smoothed voltage V8 increases. When the switching element T7 is off, a current based on the magnetic energy stored in the inductor L8 flows via the diode 5. The step-down circuit 18 can lower the smoothed voltage V8 in accordance with the duty ratio of the on-state of the switching element T7. When the output of the inverter circuit 22 is low, the step-down circuit 18 can lower the smoothed voltage V8 by decreasing the duty ratio of the switching element T7 so as to reduce the switching loss of the inverter circuit 22.

The AC-AC converter circuit 200 according to the comparative example configured as described above is provided with the smoothing capacitor C8 of a large size, and eight switching elements and six diodes are used. Thus, a disadvantage with the AC-AC converter circuit 200 is that it is difficult to reduce the size of the circuit as a whole.

With such a problem with the comparative example as a background, we return to the description of the AC-AC converter circuit 100 according to the embodiment. In a configuration in which the inverter circuit is operated based on a rectified voltage derived from rectifying an AC voltage, there are issues of the power factor and high-order harmonics. The issues cannot occur in a configuration in which the inverter circuit is operated based on a DC voltage such as that of a storage battery which is substantially free of voltage fluctuation. Through our repeated studies and trial-and-error approaches about this issue, we have devised a configuration in which a Z source circuit is provided in a stage subsequent to the rectifier circuit. According to this configuration, the size of the circuit as a whole can be reduced by removing or reducing the size of the smoothing capacitor and reducing the number of switching elements and diodes.

The Z source circuit 20 is provided between the rectifier circuit 16 and the inverter circuit 22. In the example of FIG. 1, the Z source circuit 20 is provided in a stage subsequent to the step-down circuit 18 and in a stage preceding the inverter circuit 22. The Z source circuit 20 includes two inductors L1, L2 and two capacitors C1, C2. The input end of the inductor L1 and the positive end of the capacitor C1 are connected to the output end 18p on the positive side of the step-down circuit 18. The input end of the inductor L2 and the negative end of the capacitor C2 are connected to the output end 16m of the rectifier circuit 16. The output end of the inductor L1 and the positive end of the capacitor C2 are connected to the output end 20p on the positive side of the Z source circuit 20. The inductances of the inductors L1, L2 may be different, but, in this example, are equal. The capacitances of the capacitors C1, C2 may be different, but, in this example, as equal.

The inductors L1, L2 induce a step-up action and inhibits an abrupt reduction in the inductor current according to the switching operation of the switching elements T1-T6. The capacitors C1, C2 negatively feedback the voltage variation at the output ends 20p, 20m on the output side of the Z source circuit 20 to the input side of the Z source circuit 20 and inhibits an abrupt voltage change at the output ends 20p, 20m. By operating in this way, the Z source circuit 20 can improve the power factor of the input current Ip and reduce high-order harmonics.

Figure 8:
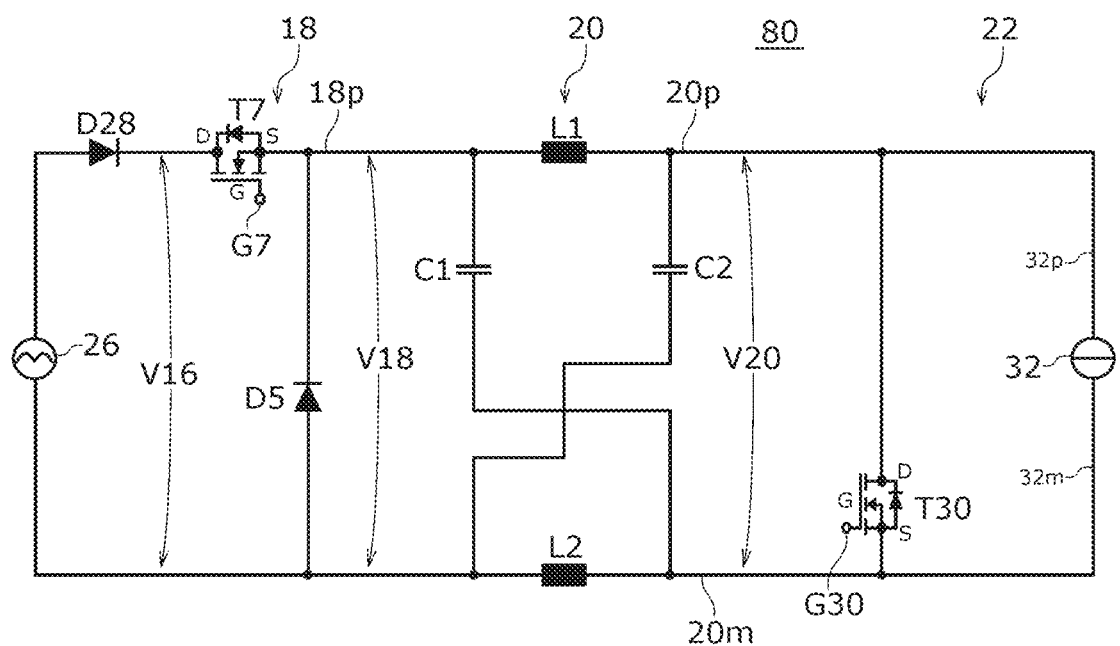
FIG. 8 is a circuit diagram showing an example of an equivalent circuit of the AC-AC converter circuit of FIG. 1.

A description will now be given of the operation of the AC-AC converter circuit 100 by using an equivalent circuit. FIG. 8 is a circuit diagram showing an example of an equivalent circuit 80 of the AC-AC converter circuit 100. The equivalent circuit 80 includes a voltage source 26, a diode D28, the step-down circuit 18, the Z source circuit 20, a switching element T30, and a bidirectional current source 32. The voltage source 26 is an equivalent element that includes the single-phase power source 12, the filter 14, and the rectifier circuit 16 and is a voltage source that outputs the absolute value of a sinusoidal wave as the rectified voltage V16. The diode D28 is an element equivalent to the backflow prevention function of the rectifier circuit 16. The switching element T30 is an element equivalent to some of the switching elements T1-T6. The bidirectional current source 32 is an element equivalent to the load of the inverter circuit 22 and is a current source capable of producing a source current and a sink current.

The circuit elements are connected in the equivalent circuit 80 as described below. The positive end of the voltage source 26 is connected to the anode of the diode D28. The cathode of the diode D28 is connected to the drain of the switching element T7 of the step-down circuit 18. The negative end of the voltage source 26 is connected to the cathode of the diode D28, the input end of the inductor L2, and the negative end of the capacitor C2. The step-down circuit 18 and the Z source circuit 20 are as described above. The output end 20p on the positive side of the Z source circuit 20 is connected to a drain D30 of the switching element T30 and a positive end 32p of the bidirectional current source 32. The output end 20m on the negative side of the Z source circuit 20 is connected to the source of the switching element T30 and a negative end 32m of the bidirectional current source 32.

Figure 9:
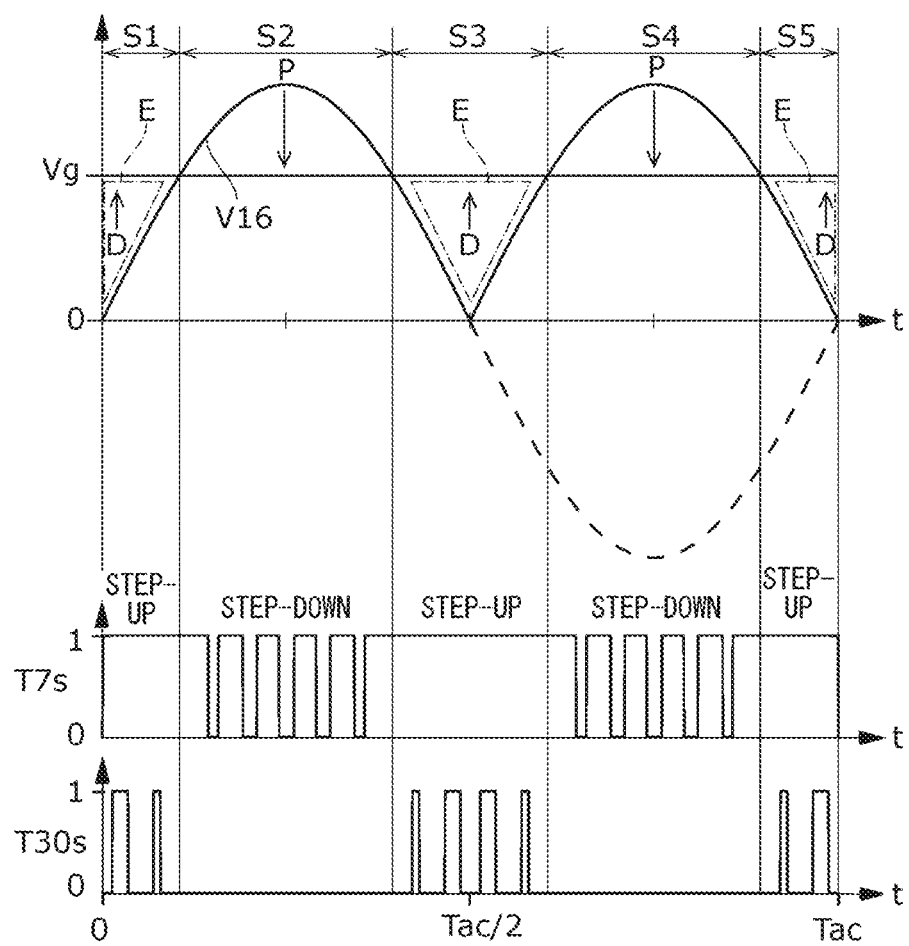
FIG. 9 is a timing chart showing the rectified voltage of the AC-AC converter circuit of FIG. 1 and an example of switching of the switching elements.

A description will be given of the operation of the equivalent circuit 80. FIG. 9 is a timing chart showing the rectified voltage V16 and an example of switching of the switching elements T7, T30. FIG. 9 shows one period Tac of the AC voltage V12 from the single-phase power source 12.

The rectified voltage V16 alternate between a large peak and a large dip at an interval of Tac/2. Referring to FIG. 9, a virtual DC voltage Vg functions as a threshold value referred to when switching between a step-up operation and a step-down operation. The virtual DC voltage Vg may be set in association with the desired supply voltage V20.

Referring to FIG. 9, the rectified voltage V16 can be segmented into periods S1-S5 with reference to the virtual DC voltage Vg. When the rectified voltage V16 exceeds the virtual DC voltage Vg, the AC-AC converter circuit 100 performs a step-down operation and curtails the peak of the rectified voltage V16 as indicated by the arrow P. During the periods S2, S4, the rectified voltage V16 exceeds the virtual DC voltage Vg, and the AC-AC converter circuit 100 performs a step-down operation of curtailing the peak of the rectified voltage V16 as indicated by the arrow P. During the periods S1, S3, S5, the rectified voltage V16 is equal to or lower than the virtual DC voltage Vg, and the AC-AC converter circuit 100 performs a step-up operation of compensating for a dip E of the rectified voltage V16.

Referring to FIG. 9, the waveform denoted by a symbol T7s shows the operating condition of the switching element T7, level 1 showing ON, and level 0 showing OFF. The waveform denoted by a symbol T30s shows the operating condition of the switching element T30, level 1 showing ON, and level 0 showing OFF.

A description will be given of the step-down operation. In the step-down operation, the switching element T30 is maintained in an OFF state, and the switching element T7 is controlled to perform a switching operation of periodically repeating ONs and OFFs. When the switching element T7 is on, the current from the voltage source 26 flows in the inductors L1, L2 and the bidirectional current source 32, and magnetic energy is stored in the inductors L1, L2. When the switching element T7 is switched to OFF, the current based on the magnetic energy stored in the inductors L1, L2 flows in the inductors L1, L2 and the bidirectional current source 32 via the diode D28. As a result, the voltage derived from stepping down the rectified voltage V16 according to the switching duty ratio of the switching element T7 can be obtained as the supply voltage V20 of the Z source circuit 20. In other words, the supply voltage V20 having the peak curtailed by the ON/OFF operation of the switching element T7 can be obtained in the step-down operation.

A description will now be given of the step-up operation. In the step-up operation, the switching element T7 is maintained in the ON state, and the switching element T30 is controlled to perform a switching operation of periodically repeating ONs and OFFs. When the switching element T30 is on, the current flowing in the switching element T30 flows in the inductors L1, L2, and magnetic energy is stored in the inductors L1, L2. When the switching element T7 is switched to OFF, the current based on the magnetic energy stored in the inductors L1, L2 flows in the inductors L1, L2 and the bidirectional current source 32. As a result, the voltage derived from stepping up the rectified voltage V16 according to the switching duty ratio of the switching element T30 is obtained as the supply voltage V20 of the Z source circuit 20. In other words, the supply voltage V20 having a dip mitigated by the ON/OFF operation of the switching element T30 can be obtained in the step-up operation.

Figure 10:
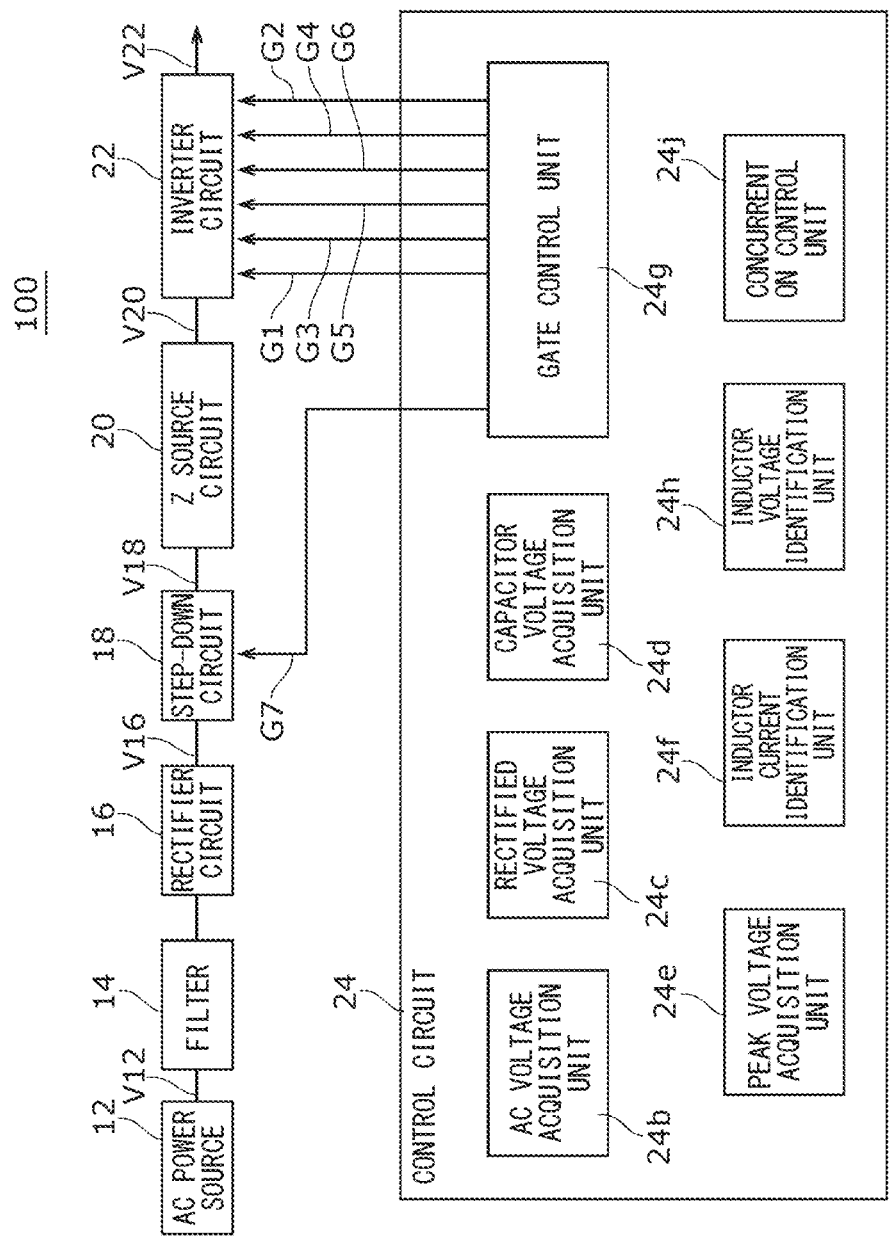
FIG. 10 is a block diagram showing an example of the control circuit of the AC-AC converter circuit of FIG. 1.

FIG. 10 is a block diagram showing an example of the configuration of the AC-AC converter circuit 100. In FIG. 10, some of the elements that are not important for the purpose of description are omitted from the illustration. The functional blocks of the control circuit 24 depicted in FIG. 10 are implemented in hardware such as electronic devices or mechanical components like a CPU of a computer, and in software such as a computer program. FIG. 10 depicts functional blocks implemented by the cooperation of these elements. Therefore, it will be understood by those skilled in the art that the functional blocks may be implemented in a variety of manners by a combination of hardware and software.

The control circuit 24 includes an AC voltage acquisition unit 24b, a rectified voltage acquisition unit 24c, a capacitor voltage acquisition unit 24d, a peak voltage identification unit 24e, an inductor current identification unit 24f, an inductor voltage identification unit 24h, a gate control unit 24g, and a concurrent ON control unit 24j. The AC voltage acquisition unit 24b acquires the AC voltage V12 from the single-phase power source 12. The rectified voltage acquisition unit 24c acquires the rectified voltage V16 from the rectifier circuit 16. The capacitor voltage acquisition unit 24d acquires the voltage across each of the capacitors C1, C2. The peak voltage identification unit 24e identifies the peak of the rectified voltage V16 from the rectified voltage V16 acquired. In accordance with the rectified voltage V16, the concurrent ON control unit 24j identifies the timing of concurrent ON in the form of a short control signal TST. The short control signal TST will be described later (see FIG. 12, FIG. 11).

The inductor current identification unit 24f identifies the inductor current that should be induced in the inductors L1, L2 by referring to the voltages across the capacitors C1, C2 acquired. The inductor voltage identification unit 24h identifies the voltages across the inductors L1, L2 as inductor voltages, by referring to the inductor current identified. The gate control unit 24g identifies the timing of ON and OFF of the switching elements T1-T6, T7 based on the inductor voltages identified and the short control signal TST and outputs the result of identification in the form of gate control signals G1-G6, G7. The gate control signals G1-G6, G7 are supplied to the gates of the switching elements T1-T6, T7, respectively, to control ON and OFF of the switching elements T1-T6, T7. The switching elements T1-T6, T7 are controlled by the control circuit 24 and operate as follows.

Figure 11:
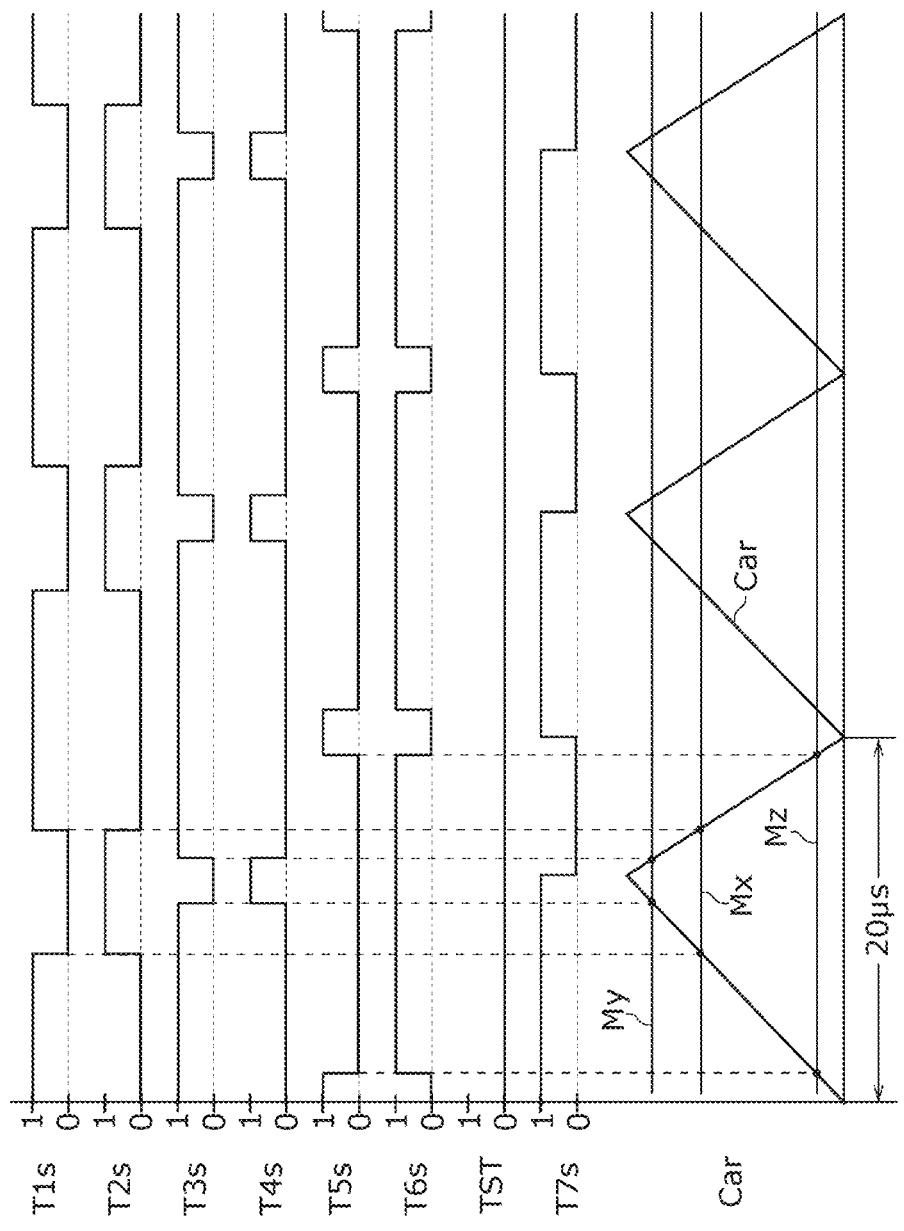
FIG. 11 is a timing chart showing an example of the operation of the switching elements in the step-down operation of the AC-AC converter circuit of FIG. 1.
Figure 12:
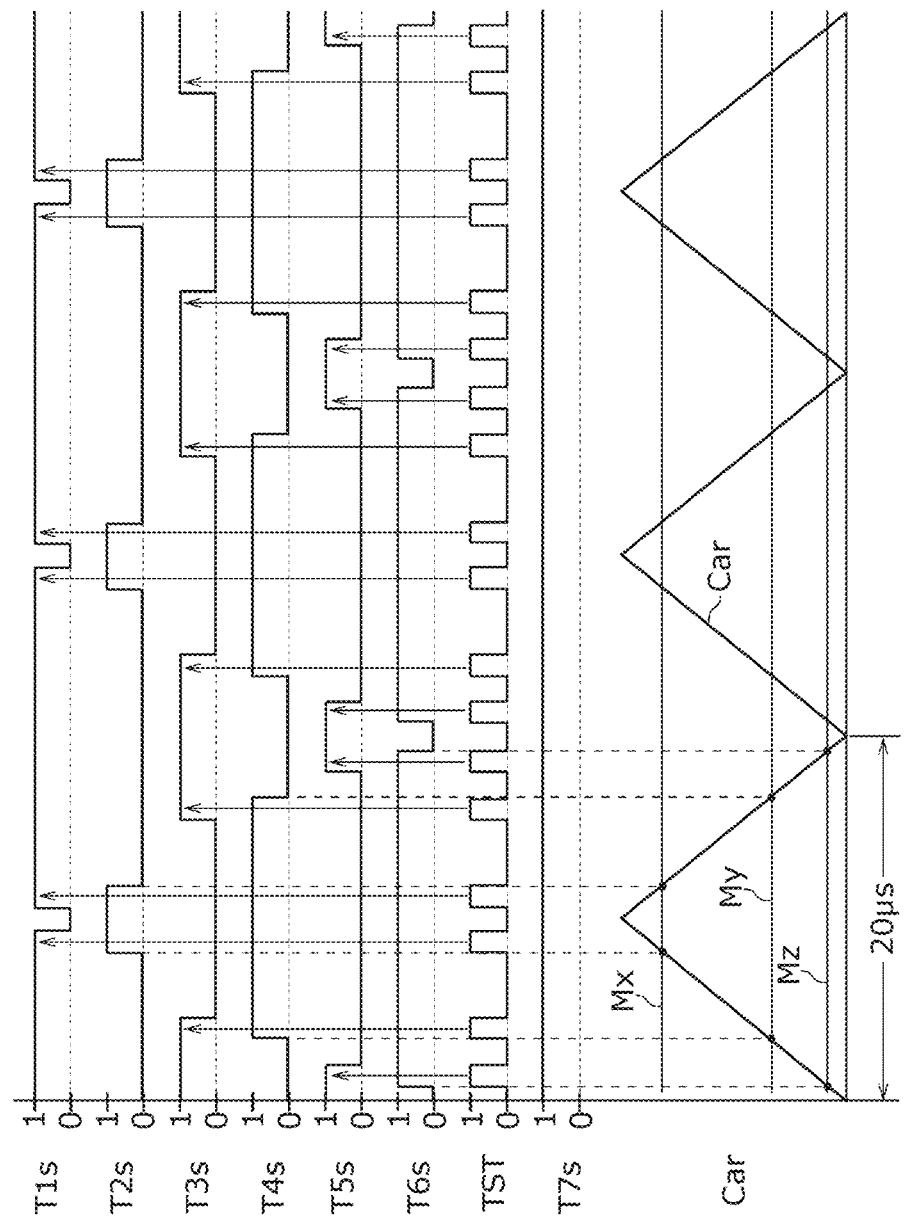
FIG. 12 is a timing chart showing an example of the operation of the switching elements in the step-up operation of the AC-AC converter circuit of FIG. 1.

FIG. 11 is a timing chart showing an example of the operation of the switching elements in the step-down operation. FIG. 12 is a timing chart showing an example of the operation of the switching elements in the step-up operation. Referring to FIGS. 11 and 12, the waveforms denoted by symbols T1s-T6s, T7s show the operating conditions of the switching elements T1-T6, T7, level 1 showing ON and level 0 showing OFF. TST denotes the short control signal, which, at level 1, controls the upper and lower switching elements to be concurrent ON. Referring to FIG. 11 and FIG. 12, Car denotes a carrier signal. In this example, the carrier signal Car is a triangular wave which repeats itself at a period of 20 μs (50 kHz).

In the examples of FIG. 11 and FIG. 12, the switching element T1 is on, and the switching element T2 is off when the modulation signal Mx in the X phase exceeds the carrier signal Car. The switching element T3 is on, and the switching element T4 is off when the modulation signal My in the Y phase exceeds the carrier signal Car. The switching element T5 is on, and the switching element T6 is off when the modulation signal Mz in the Z phase exceeds the carrier signal Car. FIG. 12 shows an additional concurrent ON operation based on the short control signal TST.

A description will be given of the case of step-down operation. When one of the upper and lower switching elements T1, T2 connected in series is on, the other is off. When one of T1, T2 is off, the other is on. When one of the switching elements T3, T4 is on, the other is off. When one of T3, T4 is off, the other is on. When one of the switching elements T5, T6 is on, the other is off. When one of T5, T6 is off, the other is on. In other words, the upper switching element and the lower switching element forming each phase arm are controlled such that when one is on, the other is off. In the step-down operation, the short control signal is maintained at level 0 so that the upper and lower switching elements are controlled not to be concurrently on.

A description will be given of the case of step-up operation. As indicated by the arrow, there is provided a period in which, when one of the switching elements T1, T2 is on, the other is concurrently on. As indicated by the arrow, there is provided a period in which, when one of the switching elements T3, T4 is on, the other is concurrently on. As indicated by the arrow, there is provided a period in which, when one of the switching elements T5, T6 is on, the other is concurrently on. In other words, there is provided a period in which, when one of the upper switching element and the lower switching element forming each phase arm is on, the other is concurrently on. The timing to turn the upper and lower switching elements concurrently on is controlled by the short control signal TST. In the step-up operation, the short control signal TST is brought to level 1 at a predetermined point of time. The switching elements T7 is maintained in the ON state (T7s=1).

A description will now be given of the benefit and advantage of the AC-AC converter circuit 100 according to the embodiment configured as described above.

The AC-AC converter circuit 100 according to the embodiment converts the AC voltage (V12) into the further AC voltage (V22), wherein the Z source circuit (20) is provided between the rectifier circuit (16) that rectifies the AC voltage (V12) and the inverter circuit (22) that generates the further AC voltage (V22). According to this configuration, the switching element T8 and the diode D8 can be removed by integrating the PFC function in the Z source circuit so that the reliability of the AC-AC converter circuit 100 is inhibited from being reduced due to the life of semiconductor elements used. Further, since the number of semiconductor elements used can be reduced, the size of the AC-AC converter circuit 100 as a whole can be easily reduced. Further, the Z source circuit 20 inhibits pulsation of the rectified voltage V16 so that the large smoothing capacitor C8 can be replaced by a small one or can be eliminated. Accordingly, the size of the AC-AC converter circuit 100 as a whole can be reduced.

The AC-AC converter circuit 100 according to the embodiment is configured such that the step-down circuit (18) is provided between the rectifier circuit (16) and the Z source circuit (20). According to this configuration, the supply voltage V20 of the Z source circuit 20 and the pulsation thereof can be reduced by inhibiting the peak of the rectified voltage V16 by means of the step-down circuit 18 so that the size of the AC-AC converter circuit 100 as a whole can be reduced. Since the voltage applied to the inverter circuit 22 can be reduced, the load on each element can be reduced and heat dissipation can be reduced. Accordingly, the size of the heat dissipating member of the inverter circuit 22 can be reduced, and the size of the AC-AC converter circuit 100 as a whole can be reduced.

The AC-AC converter circuit according to the embodiment is configured such that the inverter circuit (22) includes a first switching element (T1, T3, T5) and a second switching element (T2, T4, T6) connected in series, and there is provided a period in which, when the first switching element (T1, T3, T5) is on to generate the further AC voltage (V22), the second switching element (T2, T4, T4) is on. According to this configuration, provision of the period in which the second switching element (T2, T4, T6) is on allows the inductors L1, L2 of the Z source circuit 20 to perform a step-up operation so as to mitigate a dip in the rectified voltage V16 and inhibit the variation in the supply voltage V20 of the Z source circuit 20.

Described above is an explanation based on an exemplary embodiment. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

A description will now be given of variations. In the drawings and description of the variations, constituting elements and members identical or equivalent to those of the embodiment shall be denoted by the same reference numerals. Duplicative explanations are omitted appropriately and features different from those of the embodiment will be highlighted.

Figure 13A:
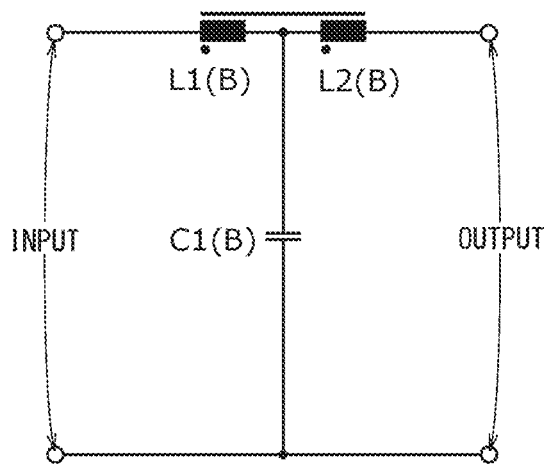
FIGS. 13A and 13B are circuit diagrams showing examples of the T source circuit and the Γ source circuit according to the first variation.
Figure 13B:
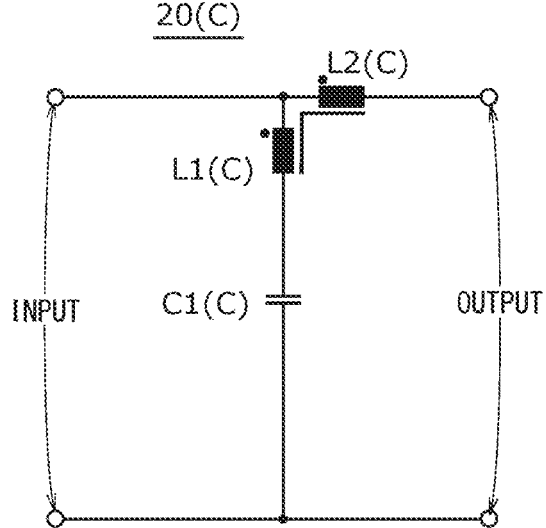

(First Variation) In the embodiment described above, the Z source circuit 20 is provided between the rectifier circuit 16 for rectifying an AC voltage and the inverter circuit 22 for generating a further AC voltage, but the embodiment is non-limiting as to the provision of the Z source circuit. For example, any impedance network circuit may be provided in place of the Z source circuit. Examples of such impedance circuits include a T source circuit and a Γ source circuit. In the AC-AC converter of the present invention, a T source circuit 20(B) or a Γ source circuit 20(C) may be provided between the rectifier circuit 16 and the inverter circuit 22 in place of the Z source circuit 20. FIGS. 13A and 13B are circuit diagrams showing examples of the T source circuit 20(B) and the Γ source circuit 20(C). FIG. 13A shows an example of the T source circuit 20(B), and FIG. 13B shows an example of the Γ source circuit 20(C). A description will now be given of the configuration and operation of the T source circuit 20(B) and the Γ source circuit 20(C) with reference also to FIG. 1.

The T source circuit 20(B) includes inductors L1(B), L2(B) and a capacitor C1(B). The inductors L1(B), L2(B) are coupled to each other magnetically and interact with each other. The input of the T source circuit 20(B) is connected to the output of the step-down circuit 18. The output of the T source circuit 20(B) is connected to the input of the inverter circuit 22. The input end of the inductor L1(B) is connected to the input end on the positive side of the T source circuit 20(B). The output end of the inductor L1(B) is connected to the input end of the inductor L2(B). The output end of the inductor L2(B) is connected to the output end on the positive side of the T source circuit 20(B). The positive end of the capacitor C1(B) is connected to the output end of the inductor L1(B). The negative end of the capacitor C1(B) is connected to the input end on the negative side of the T source circuit 20(B). The output end on the negative side of the T source circuit 20(B) is connected to the input end on the negative side of the T source circuit 20(B).

The Γ source circuit 20(C) includes inductors L1(C), L2(C) and a capacitor C1(C). The inductors L1(C), L2(C) are coupled to each other magnetically and interact with each other. The input of the Γ source circuit 20(C) is connected to the output of the step-down circuit 18. The output of the Γ source circuit 20(C) is connected to the input of the inverter circuit 22. The input end of the inductor L2(C) is connected to the input end of the Γ source circuit 20(C). The output end of the inductor L2(C) is connected to the output end on the positive side the Γ source circuit 20(C). The input end of the inductor L1(C) is connected to the input end of the Γ source circuit 20(C). The output end of the inductor L1(C) is connected to the positive end of the capacitor C1(C). The negative end of the capacitor C1(C) is connected to the input end on the negative side of the Γ source circuit 20(C). The output end on the negative side of the Γ source circuit 20(C) is connected to the input end on the negative side of the Γ source circuit 20(C).

In the first variation, the T source circuit (20(B)) or the Γ source circuit (20(C)) or the Γ source circuit (20(C)) is provided between the rectifier circuit (16) and the inverter circuit (22) in place of the Z source circuit (20). According to this configuration, the same benefit and advantage as provided by the AC-AC converter circuit 100 are provided.
(Second Variation)

In the embodiment described above, each of the diodes D1-D5 is a semiconductor diode capable of conducting electricity in one direction, but the embodiment is non-limiting as to the type of diodes. All or some of the diodes D1-D5 may be replaced by switching elements like MOSFETs capable of conducting electricity in the reverse direction. The variation provides the same benefit and advantage as provided by the AC-AC converter circuit 100 according to the embodiment.
(Third Variation)

In the embodiment described above, the switching elements T1-T7 are n-type MOSFETs, but the embodiment is non-limiting as to the type of switching elements. The switching elements T1-T6, T7 are not limited to any particular type, and any of various publicly known switching elements like bipolar transistors, insulated gate bipolar transistors (IGBT), SiC devices, GaN devices, etc. may be used. The variation provides the same benefit and advantage as provided by the AC-AC converter circuit 100 according to the embodiment.

In the embodiment described above, the operation for controlling the voltage of the AC-AC converter circuit only includes a step-down operation and a step-up operation. However, the invention is not limited to this configuration. For example, the AC-AC converter circuit according to an embodiment of the present invention may include performing a step-up and step-down operation when the input voltage $v_G$ is near 0, in addition to the step-down operation and the step-up operation described above. Hereinafter, the aforementioned step-down operation and step-up operation will be described in further detail, and the step-up and step-down operation will be described.

First, the operating condition of the equivalent circuit 80 of FIG. 8 is grouped into three modes including a first operation mode, a second operation mode, and a third operation mode, depending on the ON/OFF states of the switching elements T7, T30. Hereinafter, the first operation mode, the second operation mode, and the third operation mode may be referred to as "active mode", "step-down mode", and "step-up mode", respectively. The switching elements T7, T30 may be referred to as "step-down circuit switching element" and "inverter circuit switching element", respectively.

The equivalent circuit 80 is defined to be in an active mode when the step-down circuit switching element T7 is on and the inverter circuit switching element T30 is off.

Figure 14:
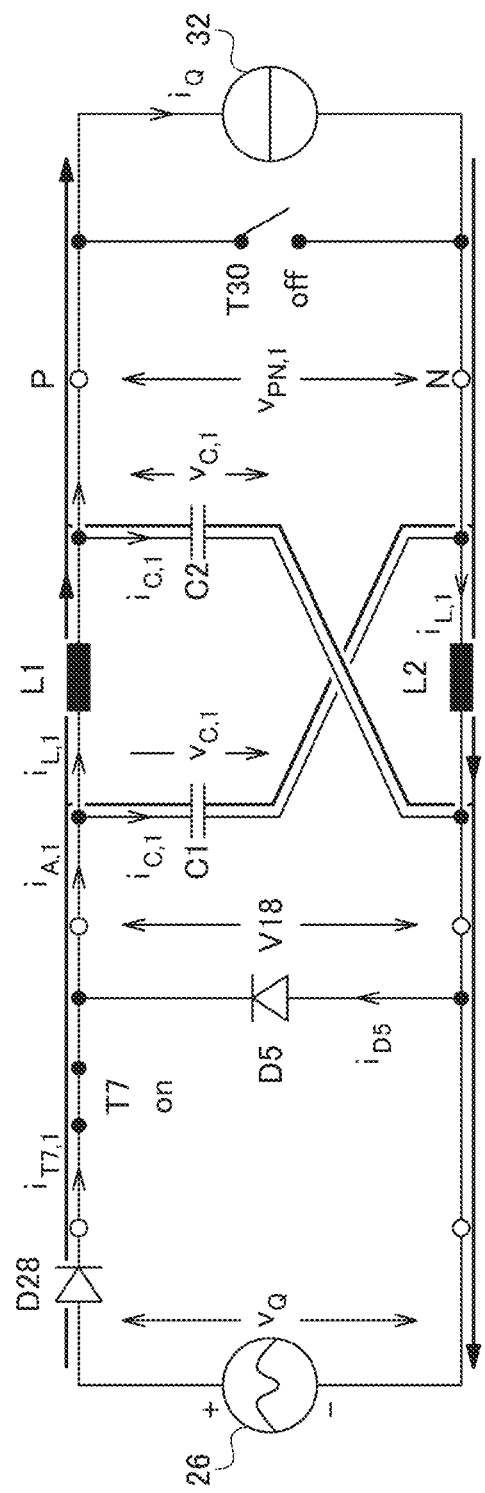
FIG. 14 shows the equivalent circuit 80 in the active mode.

FIG. 14 shows the equivalent circuit 80 in the active mode. A positive input voltage $v_G$ is applied to the anode of the diode D28. Therefore, a positive input current $i_{T7,1}$ ("T7" on the left side of the subscript denotes the switching element T7, and "1" on the right side of the subscript denotes the first operation mode (active mode). The same hereinafter) flows in the step-down circuit switching element T7. Meanwhile, the positive input voltage $v_G$ is applied to the cathode of the diode D5 so that a current does not flow in the diode D5.

The input current $i_{T7,1}$ branches into two currents, one becoming a current $i_{C,1}$ input to the capacitor C1, and the other becoming a current $i_{L,1}$ that flows in the inductor L1 (it would be normal to denote a current $i_{C1,\ 1}$ input to the capacitor C1 and a current $i_{C2,\ 1}$ input to the capacitor C2 separately for distinction, but $i_{C1,\ 1}$ and $i_{C2,\ 1}$ are collectively denoted by $i_{C,1}$ because it should be clear that $i_{C1,\ 1}=i_{C2,\ 1}$. Similarly, it would be normal to denote a current $i_{L1,\ 1}$ flowing in the inductor L1 and a current $i_{L2,\ 1}$ flowing in the inductor L2 separately for distinction, but $i_{L1,\ 1}$ and $i_{L2,\ 1}$ are collectively denoted by $i_{L,1}$ because it should be clear that $i_{L1,\ 1}=i_{L2,\ 1}$). In other words, $$i_{T7,1}=i_{C,1}+i_{L,1} \tag{1}$$

The current $i_{L,1}$ that flows in the inductor L1 branches into two currents, one becoming the current $i_{C,1}$ input to the capacitor C2, and the other becoming an output current $i_{Q,1}$. In other words, $$i_Q=i_{L,1}-i_{C,1} \tag{2}$$

Based on the two expressions above, the inductor current $i_{L,1}$ is calculated as follows.

$$i_{L,1}=i_Q/2+i_{T7,1}/2 \tag{3}$$

Since the input current $i_{T7,1}$ is positive, it is known that $$i_{L,1} \geq I_Q/2 \tag{4}$$

where $I_Q$ is an output peak current.

In other words, the inductor current $i_{L,1}$ is always ½ the output peak current $I_Q$ or larger.

As shown in FIG. 14, the input voltage $v_G$ is a sum of a voltage $v_{C,1}$ applied to the capacitor C1 and a voltage $v_{L,1}$ applied to the inductor L1 so that the following expression holds.

$$|v_G|=v_{C,1}+v_{L,1} \tag{5}$$

Further, an output voltage $v_{PN,1}$ is a sum of the voltage (capacitor voltage) $v_{C,1}$ applied to the capacitor C2 and the voltage $v_{L,1}$ applied to the inductor L2 so that the following expression holds.

$$v_{PN,1}=v_{C,1}-v_{L,1} \tag{6}$$

Therefore, $$v_{C,1}=|v_G|/2+v_{PN,1}/2 \tag{7}$$

The presence of the diode D28 makes the output voltage $v_{PN,1}$ always positive.

It is therefore known that $$v_{C,1} \geq V_G/2 \tag{8}$$

where $V_G$ is an input peak voltage.

In other words, the capacitor voltage $v_{C,1}$ is always larger than ½ the input peak voltage $v_G$.

The equivalent circuit 80 is defined to be in a step-down mode when the step-down circuit switching element T7 is off and the inverter circuit switching element T30 is off.

Figure 15:
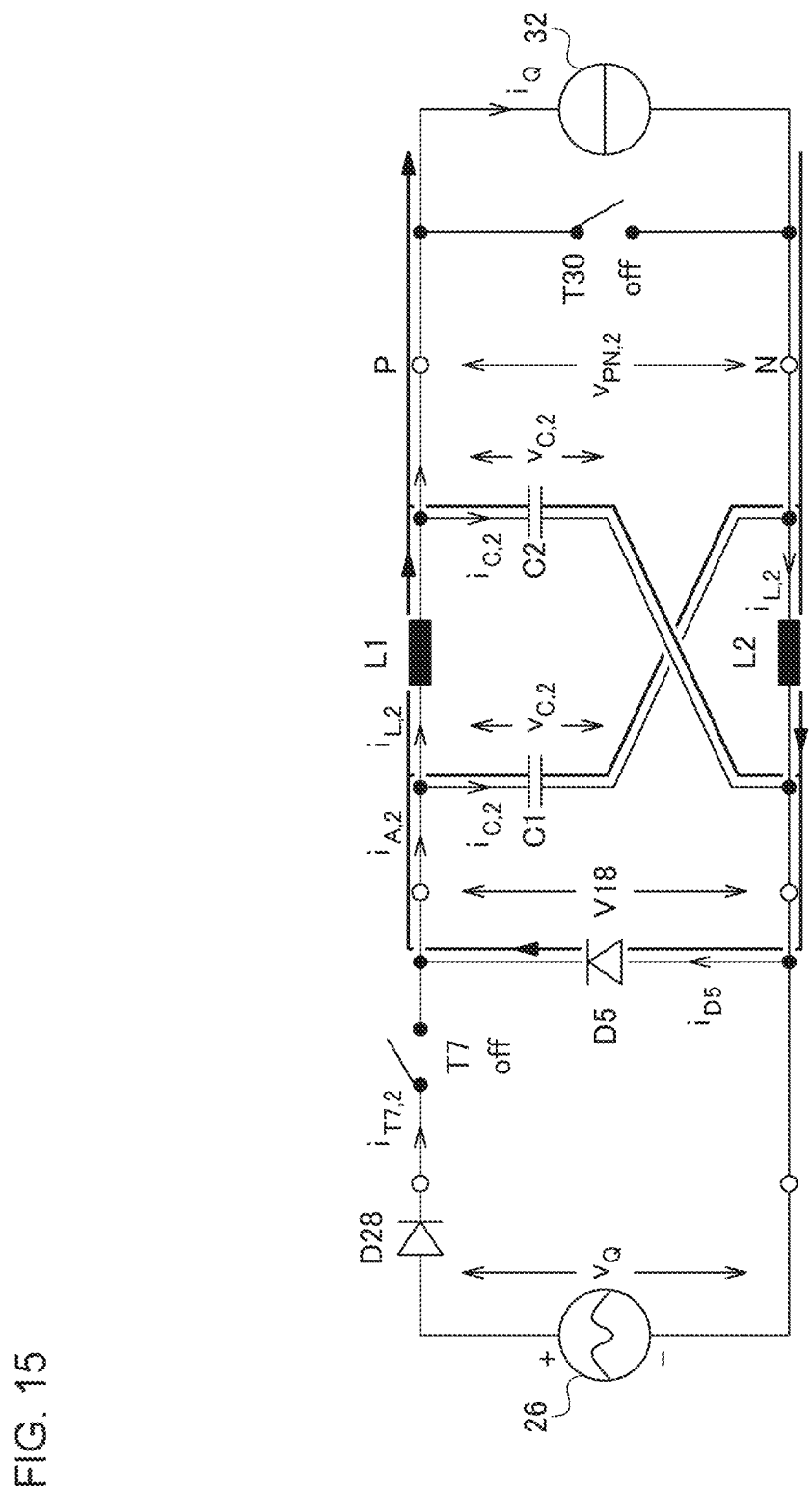
FIG. 15 shows the equivalent circuit 80 in the step-down mode.

FIG. 15 shows the equivalent circuit 80 in the step-down mode.

Since the step-down circuit switching element T7 is off, an input current $i_{T7,2}$ does not flow in the step-down circuit switching element T7. In other words, $$i_{T7,2}=0 \tag{9}$$

A positive current $i_{D5,2}$ flows in the diode D5. In other words, $$i_{D5,2}>0 \tag{10}$$

Referring to FIG. 15, the circuit configuration to the right of the diode D5 is the same as that of FIG. 11, and so a discussion similar to that of the active mode reveals that $$i_{D5,2}=i_{C,2}+i_{L,2} \tag{11}$$

$$i_Q=i_{L,2}-i_{C,2} \tag{12}$$

Based on the expressions (11) and (12), an inductor current $i_{L1,2}$ is calculated as follows.

$$i_{L,2}=i_Q/2+i_{D5,2}/2 \tag{13}$$

Since the diode current $i_{D5,2}$ is positive, it is known that $$i_{L,2} \geq I_Q/2 \tag{14}$$

In other words, the inductor current $i_{L,2}$ is always ½ the output peak current $I_Q$ or larger.

A voltage $v_{D5,2}$ applied to the diode D5 is a sum of a voltage $v_{C,2}$ applied to the capacitor C1 and a voltage $v_{L,2}$ applied to the inductor L1, and the value will be 0.

$$v_{D5,2}=v_{C,2}+v_{L,2}=0 \tag{15}$$

In other words, $v_{L,2}=-v_{C,2}$. This means that a voltage equal in magnitude to the capacitor voltage and having a reverse sign is applied to the inductor.

It is also known that an output voltage $v_{PN,2}$ is given by $$v_{PN,2}=v_{C,2}-v_{L,2}=2\cdot v_{C,2} \quad (16)$$

The equivalent circuit 80 is defined to be in the step-up mode when the inverter circuit switching element T30 is on. In this state, the step-down circuit switching element T7 may be on or off.

Figure 16:
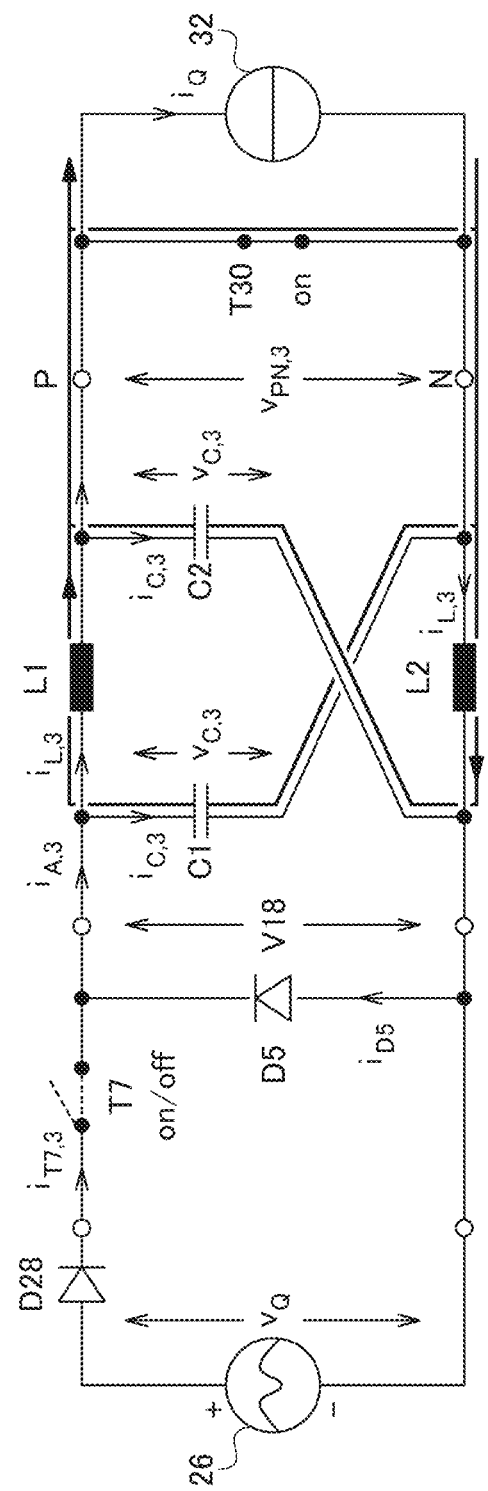
FIG. 16 shows the equivalent circuit 80 in the step-up mode.

FIG. 16 shows the equivalent circuit 80 in the step-up mode.

Since the inverter circuit switching element T30 is on, the current shoots through the inverter circuit switching element T30 before the bidirectional power source 32 so that an output voltage $v_{PN,3}$ will be 0. Therefore, electric power is not supplied to the load such as a motor. In other words, $$v_{PN,3}=v_{C,3}-v_{L,3}=0 \quad (17)$$

The expression (17) shows that $v_{L,3}=v_{C,3}$. This means that a voltage equal in magnitude to the capacitor voltage and having the same sign is applied to the inductor.

A voltage $v_{D5,3}$ applied to the diode D5 is calculated as follows.

$$v_{D5,3}=v_{C,3}+v_{L,3}=2\cdot v_{C,3} \quad (18)$$

Thus, the positive input voltage $v_G$ from the two capacitors is applied to the cathode of the diode D5 so that a current does not flow in the diode D5.

Further, so long as the condition "the capacitor voltage $v_{C,3}$ is always larger than ½ the input peak voltage $V_G$", i.e., the condition $$v_{C,3}>V_G/2 \quad (19)$$

is met, $v_{D5,3}>|v_G|$ holds so that a current does not flow in the step-down circuit switching element T7 even if the step-down circuit switching element T7 is on.

As will be known from the above description, a current path is formed only in the Z source circuit in the step-up mode.

A description will be given of an operation in the embodiment described above, i.e., an operation for controlling the voltage of the AC-AC converter circuit that includes only the step-down operation and the step-up operation.

In the step-down operation, the inverter circuit switching element T30 is maintained in an OFF state, and the step-down circuit switching element T7 is controlled to perform a switching operation of periodically repeating ONs and OFFs. In other words, control is performed in the step-down operation so that the active mode and the step-down mode are periodically repeated.

In the step-up operation, on the other hand, the step-down circuit switching element T7 is maintained in an ON state, the inverter circuit switching element T30 is controlled to perform a switching operation of periodically repeating ONs and OFFs. In other words, control is performed in the step-up operation so that the active mode and the step-up mode are periodically repeated.

The proportion of the period of time in which the active mode is used during one switching period $T_{SW}$ is denoted by $d_A$, the proportion of the period of time in which the step-down mode is used is denoted by $d_0$, and the proportion of the period of time in which the step-up mode is used is denoted by $d_B$ (hereinafter, $d_A$, $d_0$, $d_B$ may be referred to as duties). In other words, the periods of time in which the respective modes are used during one switching period $T_{SW}$ are as follows. In the step-down operation, a period of time tA in which the active mode is used given by tA=$d_A \cdot T_{SW}$, and a period of time t0 in which the step-down mode is used is given by t0=$d_0 \cdot T_{SW}$, where $d_A+d_0=1$, $d_B=0$. In the step-up operation, a period of time tA in which the active mode is used is given by tA=$d_A \cdot T_{SW}$, and a period of time tB in which the step-up mode is used is given by tB=$d_B \cdot T_{SW}$, where $d_A+d_B=1$, $d_0=0$. By changing the values of the duties $d_A$, $d_0$, $d_B$ of the respective modes, the output voltage vPN can be controlled.

Averaging the above results over the switching period in a steady state gives the following circuit model (< > indicates an average value).

$$<v_{PN}>=2\cdot v_C\cdot(1-d_B)-|v_G|\cdot d_A \quad (20)$$

$$<v_L>=|v_G|\cdot d_A-v_C\cdot(1-2\cdot d_B) \quad (21)$$

$$<i_Q>=P_M/<v_{PN}> \quad (22)$$

$$<i_{T7}>=|i_G|=(2\cdot i_L-<i_Q>)\cdot d_A \quad (23)$$

A description will be given, based on the above discussion, of a method of calculating an optimum duty in the embodiment that includes only the step-down operation and the step-up operation are included for control of the voltage in the AC-AC converter apparatus according to the present invention.

First, the duties $d_a$, $d_0$, $d_B$ of the respective modes are represented as respective sums of the duties $D_A$, $D_0$, $D_B$ occurring when the circuit is in a steady state and minute variations $d'_A$, $d'_0$, $d'_B$ from the steady state. In other words, $$d_A=D_A+d'_a \quad (24)$$

$$d_0=D0+d'_0 \quad (25)$$

$$d_B=D_B+d'_b \quad (26)$$

First, the duties $D_A$, $D_0$, $D_b$ occurring when the circuit is in a steady state are calculated. Generally, it is desirable to maintain the inductor current $i_L$ as small as possible in an AC-AC converter apparatus in order to avoid the energy loss from, for example, the Joule heat produced in the inductor. In other words, the efficiency of the apparatus can be maximized by minimizing the inductor current $i_L$. In this background, definition of a duty that minimizes $i_L$ in a range that meets a given restraint condition is set as a goal.

First, since an average inductor voltage $<v_L>$ is 0, an average output voltage $<v_{PN}>$ is determined from the expressions (20), (21).

$$<v_{PN}>=<v_C>=|v_G|\cdot D_A/(1-2\cdot D_B) \quad (27)$$

It should be noted, however, that the expressions (8), (19) show that $$<v_{PN}>=<v_C>>V_G/2 \quad (28)$$

should be met.

Defining a modulation factor m to be a ratio between the input voltage $|v_G|$ and the output voltage $|v_{PN}|$, the expression (27) teaches that m is given by $$m=|v_G|/<v_{PN}>=(1-2\cdot D_B)/D_A \quad (29)$$

It should be noted, however, that $|v_G|>0$ and the expressions (8) require that $$0\leq m\leq 2 \quad (30)$$

be met.

The expression (23) gives $$i_L=(\tfrac{1}{2})\cdot(<i_Q>+|i_G|/D_A) \quad (31)$$

This shows that the larger the duty $D_A$ in the active mode, the smaller the value of the inductor current $i_L$.

When the input voltage is equal to or larger than the output voltage (i.e., when 1≤m≤2), the step-down operation is performed so that $$D_{A,BU}=1/m \quad (32)$$

$$D_{B,BU}=0 \quad (33)$$

$$D0_{,BU}=1-1/m=(m-1)/m \quad (34)$$

(BU on the right side of the subscript denotes step down (Buck))

$d_{A,BU}$ given by the expression (32) represents the maximum value of $D_{A,BU}$ occurring when 1≤m≤2.

When the input voltage is equal to or larger than the output voltage (i.e., when 1≤m≤1), the step-up operation is performed so that $$D_{A,BO}=1/(2-m) \quad (35)$$

$$D_{B,BO}=1-1/(2-m)=(1-m)/(2-m) \quad (36)$$

$$D_{0,BO}=0 \quad (37)$$

(BO on the right side of the subscript denotes step up (Boost))

$D_{A,BO}$ given by the expression (35) represents the maximum value of $D_{A,BO}$ occurring when 1≤m≤1. The expression (32) and the expression (35) are summarized by the following expression.

$$D_{A,BU/BO}=\min(1/m, 1/(2-m)) \quad (37)$$

where min( ) denotes using the smaller of the values in ( ).

As described above, the inductor current $i_L$ can be minimized by defining the duties according to the expressions (32), (33), (34), (35), (36), (37), when the step-down operation and the step-up operation are included for voltage control in the AC-AC converter apparatus. This concludes the description of the method of calculating an optimum duty in the embodiment including only the step-down operation and the step-up operation for voltage control of the AC-AC converter apparatus according to the present invention.

It should be reminded that, as described above, the inductor current $i_L$ need be equal to larger than ½ the peak current $I_Q$ in order for the AC-AC converter apparatus to operate normally. In other words, $$i_L \geq (1/2) \cdot I_Q \quad (38)$$

Figure 17:
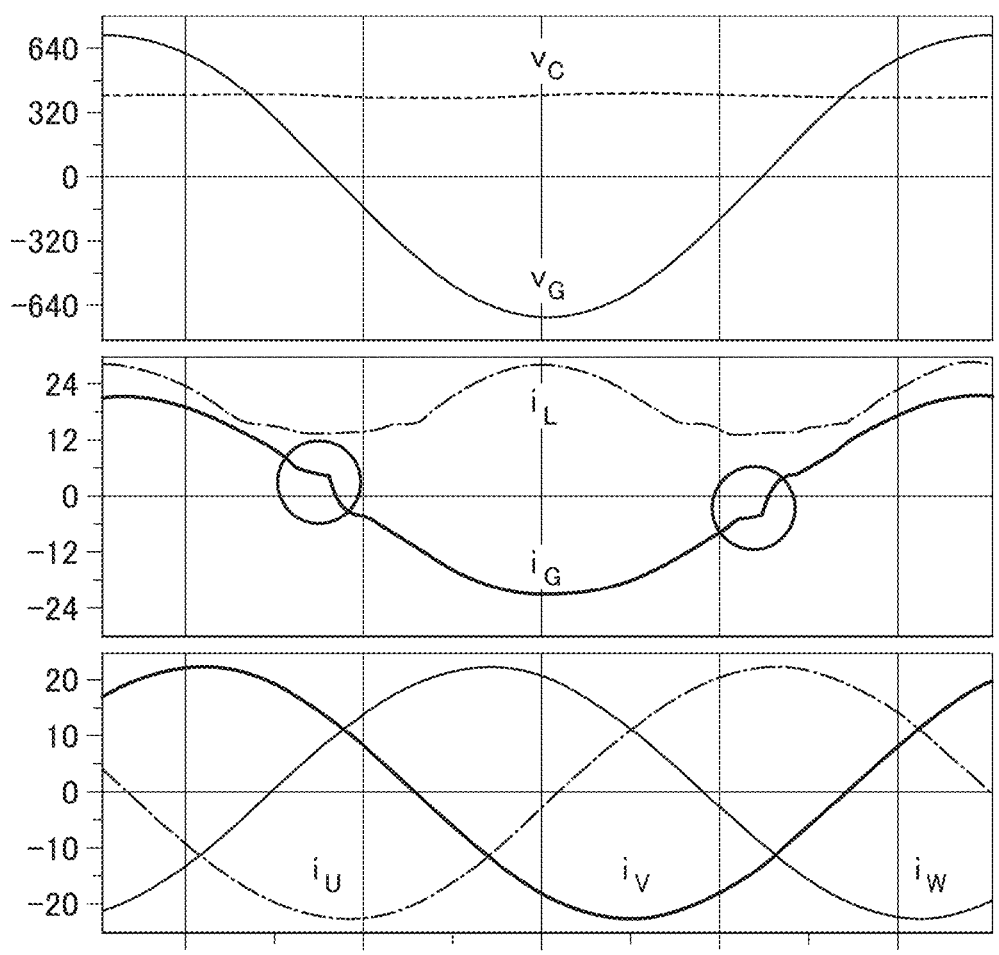
FIG. 17 shows the input current $i_G$ and the inductor current $i_L$ occurring when the step-down operation and the step-up operation are performed for control.

FIG. 17 shows the input current $i_G$ and the inductor current $i_L$ occurring when the step-down operation and the step-up operation are performed for control. The duties $D_{A,BU}$, $D_{B,BU}$, $D_{0,BU}$, $D_{A,BO}$, $D_{B,BO}$, $D_{0,BO}$ are defined according to the expressions (32), (33), (34), (35), (36), respectively. It is known that a disturbance in the sinusoidal waveform of the input current $i_G$ is produced near $i_G=0$ as shown in FIG. 17 when only the step-down operation and the step-up operation are used for control. In other words, the targeted control for the power factor=1 cannot be achieved near the input current $i_G$ of 0. We have realized that this is caused by the failure to meet the condition of the expression (38) near the input current $i_G$ of 0 according to the control based only on the step-down operation and the step-up operation.

We have made further studies and found out that the above issue can be resolved by performing control according to a step-up and step-down operation near the input voltage $v_G$ of 0, in addition to control based only on the step-down operation and the step-up operation.

As described above, only the active mode and the step-down mode are used in the step-down operation. In other words, $$D_{A,BU}+D_{B,BU}=1 \quad (39)$$

$$D_{0,BU}=0 \quad (40)$$

In the step-up operation, only the active mode and the step-up mode are used. In other words, $$D_{A,BO}+D_{0,BO}=1 \quad (41)$$

$$D_{B,BO}=0 \quad (42)$$

In contrast, the three modes, i.e., the active mode, the step-down mode, and the step-up mode are used in the step-up and step-down operation. In other words, $$D_{A,BB}+D_{B,BB}+D_{0,BB}=1 \quad (43)$$

(BB on the right side of the subscript denotes step-up and step-down (Buck-Boost).

A description will now be given of a method of calculating an optimum duty when the step-up and step-down operation is introduced. As described above, the aim of the step-up and step-down operation is to guarantee that the condition of the expression (38) holds near the input voltage $v_G$ of 0. Replacing the duty $D_A$ in the active mode by the duty $D_{A,BB}$ in the active mode in the step-up and step-down operation in the expression (23), we obtain $$|i_G|=(2 \cdot i_L - <i_Q>) \cdot D_{A,BB} \quad (44)$$

From this, we obtain $$D_{A,BB}=|i_G|/(2 \cdot i_L - <i_Q>) \quad (45)$$

Assuming that the expression (38) is met, we let $i_L=(1/2) \cdot I_Q$ ($I_Q$ is the output peak current). Therefore, the duty $D_{A,BB}$ in the active mode in the step-up and step-down operation is given by $$D_{A,BB}=|i_G|/(I_Q - <i_Q>) \quad (46)$$

A constant K that is defined as follows is introduced to obtain $D_{A,BB}$ that depends on the modulation factor m. If we let $$i_G=2 \cdot P_M \cdot v_G/V_G^2 \quad (47)$$

$$<v_{PN}>=<v_C> \quad (48)$$

$$m=|v_G|/<v_{PN}> \quad (49)$$

$$P_M=(3/2) \cdot V_Q \cdot I_Q \cdot \cos \varphi \quad (50)$$

$$M=2 \cdot V_M/v_c \quad (51)$$

then it is given that $$D_{A,BB}=(6M \cdot \cos \varphi/(4-3M \cdot \cos \varphi)) \cdot (v_C/V_G)^2 m = k \cdot m \quad (52)$$

It should be noted that $$M<M_{max}=2/\sqrt{3} \quad (53)$$

$$\cos \varphi < 1 \quad (54)$$

hold, where $P_M$ denotes the output power, and M denotes the inverter modulation factor.

In other words, it is defined that $$k=6M \cdot \cos \varphi/(4-3M \cdot \cos \varphi) \quad (55)$$

Based on the foregoing, the optimum duties are calculated as follows.

$$D_A=\min(D_{A,BU/BO}, D_{A,BB}) \quad (56)$$

$$D_B=(1/2) \cdot (1-m \cdot D_A) \quad (57)$$

The duty $D_{A,BB}$ in the active mode in the step-up and step-down operation may be defined in the following range, instead of using the expression (52).

$$D_{A,BB} \geq (6M \cdot \cos \varphi)/(4-3M \cdot \cos \varphi) \cdot (v_C/V_G)^2 \cdot m = k \cdot m \quad (58)$$

By defining $D_{A,BB}$ in the range given by the expression (58), the range that includes the permitted distortion rate defined in the standard in the art can be covered.

As shown by the expression (56), the optimum duty $D_A$ in the active in the steady mode is defined to be the smaller of $D_{A,BU/BO}$ and $D_{A,BB}$ in order to minimize the inductor current $i_L$. Further, as shown in the expression (52), the optimum duty $D_{A,BB}$ in the active mode in the step-up and step-down operation have a value proportional to the modulation factor m. The proportionality factor k in this case is given by the expression (55). The duty $D_{A,BU/BO}$ in the steady state is valid in the step-down operation and in the step-up operation and is determined by the minimum value of the duty $D_{A,BU}$ in the active mode in the step-down operation and the duty $D_{A,BO}$ in the active mode in the associated step-up operation. These operation modes are determined by the coefficient k.

Figure 18A:
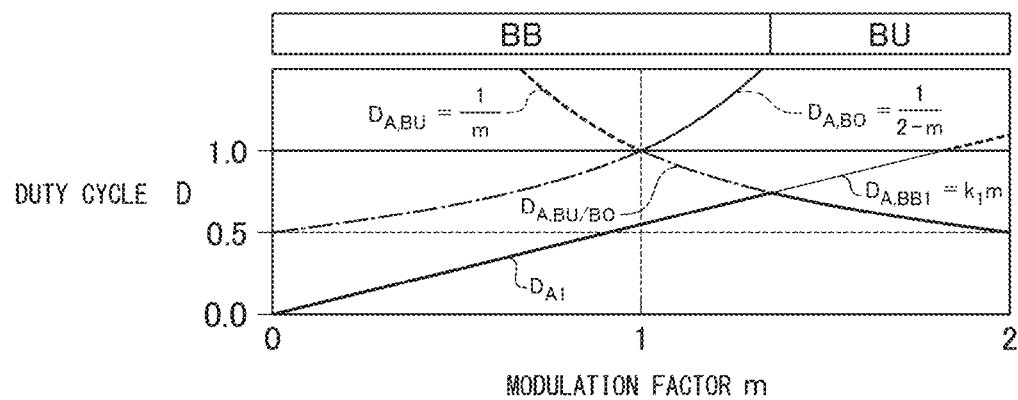
FIGS. 18A and 18B show examples of the operation mode.

FIG. 18A shows an exemplary operation mode occurring when $k=k_1<1$.

Figure 18B:
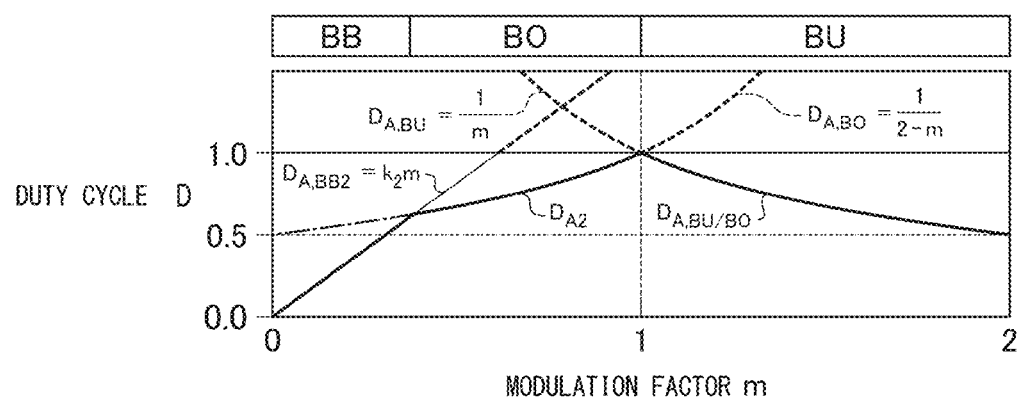

FIG. 18B shows another exemplary operation mode occurring when $k=k_2>1$.

As shown in FIG. 18A, only the step-up and step-down operation (BB) and the step-down operation (BU) are used when $k=k_1$.

Further, as shown in FIG. 18B, the step-up and step-down operation (BB), the step-down operation (BU), and the step-up operation (BO) are used when $k=k_2$.

Figure 19:
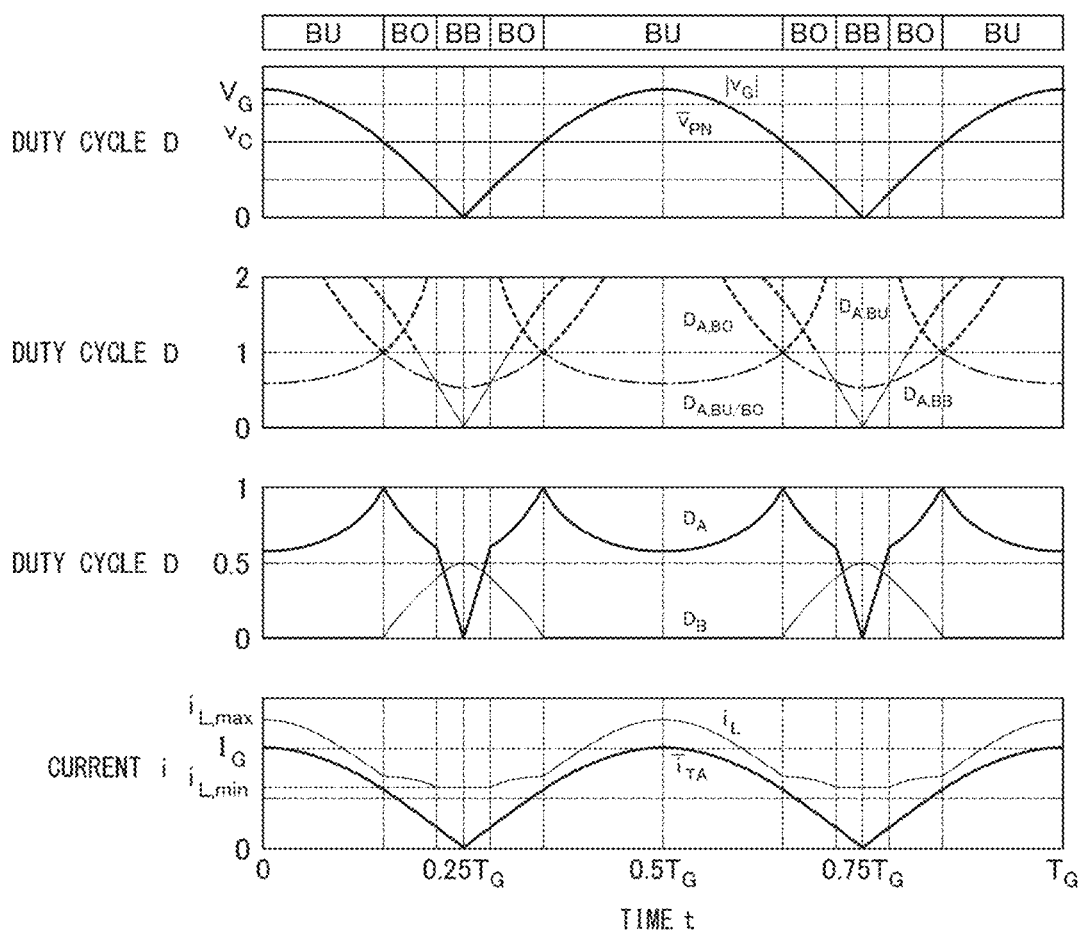
FIG. 19 shows a result of performing the control of minimizing the inductor current $i_L$.

FIG. 19 shows a result of performing the control of minimizing the inductor current $i_L$ based on the method described above.

By determining the duties $D_{A,BU}$, $D_{A,BO}$, $D_{A,BU/BO}$ in the active mode in the steady state from the rectified input voltage $|v_G|$ and output voltage $\langle v_{PN} \rangle$ ($=\langle v_C \rangle$ (capacitor voltage)), the optimum $D_A$, $D_B$ can be obtained. As a result, it is known that the completely rectified input current $\langle i_{TA} \rangle$ and inductor current $i_L$ are obtained during one period of the input power, as shown in FIG. 19.

The minute variation $d'_A$, $d'_0$, $d'_B$ from the steady state of the duties in the respective modes given by the expressions (24), (25), (26) are obtained. Substituting the expressions (24), (25) into (21) and extracting the component of variation from the steady state, the following expression is obtained.

$$v_L' = |v_G| \cdot d'_A + 2 \cdot v_C \cdot d'_B \quad (59)$$

where $v_L'$ denotes the variation of the inductor voltage $v_L$ from the steady state.

In the step-down operation, $d_{0,BU}=0$ because of the shoot through. Further, it is known that $d'_{0,BU}=0$ because $D_{0,BU}=0$.

In the step-up operation, $d_{0,BO}=0$, $d_{A,BO}+d_{B,BO}=1$ so that $d'_{A,BO}=-d'_{B,BO}$.

In the step-up and step-down operation, $d_{0,BB}$ is determined as a value that minimizes the inductor current $i_L$. Therefore, the variation $d'_{A,BB}$ from the steady state of $d_{A,BB}$ does not occur, and only the variation $d'_{B,BB}$ from the steady state of $d_{B,BB}$ occurs.

The results above are summarized and represented in the following vector format.

$$(d'_{A,BU}, d'_{B,BU}) = (v_L', 0) \quad (60)$$

$$(d'_{A,BO}, d'_{B,BO}) = (v_L'/(|v_G|-2\cdot v_C), -v_L'/(|v_G|-2\cdot v_C)) \quad (61)$$

$$(d'_{A,BB}, d'_{B,BB}) = (0, v_L'/2\cdot v_C) \quad (62)$$

The method of converting the duty calculated by the method described above into a switching signal for switching control will be described in detail hereinafter. As shown below, the PWM carrier of the switching signal can be made asymmetrical with respect to the time axis by subjecting the output voltage to time control properly and varying it accordingly. This allows the short period to be distributed properly.

The duties $d_A$, $d_0$, $d_B$ in the respective modes and the inverter duties $d_U$, $d_V$, $d_W$ are converted into signals $S_A$, $S_1$, $S_2$, $S_3$, $S_4$, $S_5$, $S_6$ to control the actual transistor switches.

First, a description will be given of the operation of the converter according to a comparative example in which a constant DC link voltage is used.

Figure 20A:
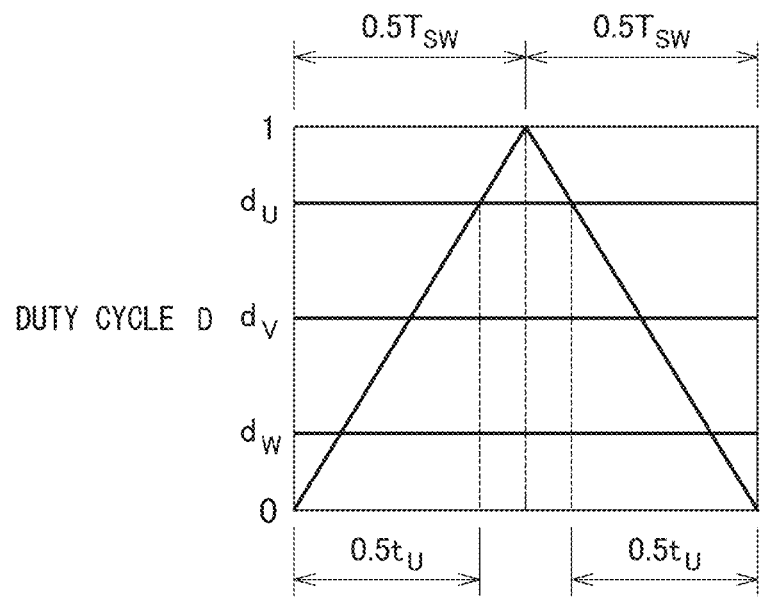
FIGS. 20A and 20B show a carrier signal and a U-phase voltage waveform of the converter according to the comparative example.

FIG. 20A shows a carrier signal of the converter according to the comparative example.

Figure 20B:
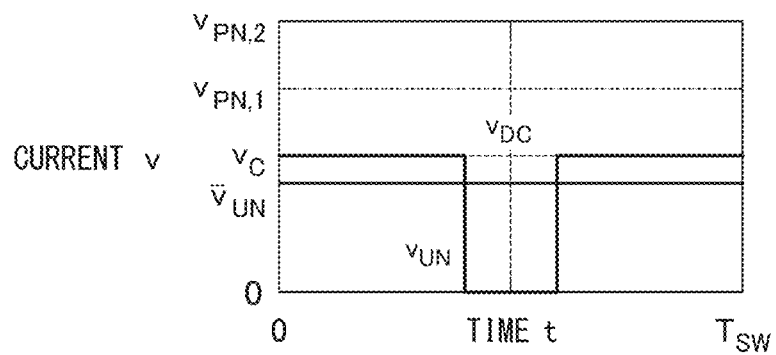

FIG. 20B shows a U-phase voltage waveform of the converter according to the comparative example.

As shown in FIG. 20A, the switch signal during one switching period and the phase voltage waveform of each phase are determined by comparing a triangular carrier waveform (PWM carrier) of a horizontally symmetrical shape with the inverter duties $d_U$, $d_V$, $d_W$.

FIG. 20B shows the phase voltage waveform in the U phase, but a similar waveform is exhibited in the V phase and the W phase.

As shown in FIG. 20B, the phase voltage $v_{XN}$ will be the DC link voltage $V_{DC}$ when the carrier waveform is smaller than $d_X$ (where $X \in \{U, V, W\}$). In other words, $$v_{XN} = V_{DC} \quad (63)$$

in this case.

The other phase outputs are 0.

In other words, the average X phase voltage $\langle v_{XM} \rangle$ will be $v_{DC} \cdot d_X$.

$$\langle v_{XN} \rangle = v_{DC} \cdot d_X \quad (64)$$

In the converter according to the comparative example, a constant DC link voltage is used. In contrast, the output voltage $v_{PN}$ in the inverter according to the present invention varies depending on the operation mode.

It is necessary to obtain an output of the same average phase voltage equally in the inverter according to the present invention.

The following two methods are conceivable as a method of realizing this.

(Method 1)

The output voltage $v_{PN}$ at shoot through is 0. For this reason, the average U phase voltage $\langle v_{UN} \rangle$ need be obtained between the active mode (i.e., $v_{PN,1}=2\cdot v_C - |v_G|$) and the step-down mode ($v_{PN,1}=2\cdot v_C$).

Method 1 realizes this by making the PWM carrier waveform asymmetrical. More specifically, the carrier waveform is changed as follows in accordance with the state of the mode.

During the active mode ($t_A=d_A \cdot T_{SW}$): changes from 0 to 1

During the step-down mode ($t_0=d_0 \cdot T_{SW}$): changes from 0 to 1

Step-up mode (shoot through) ($t_B=d_B \cdot T_{SW}$): maintained at 0

Figure 21A:
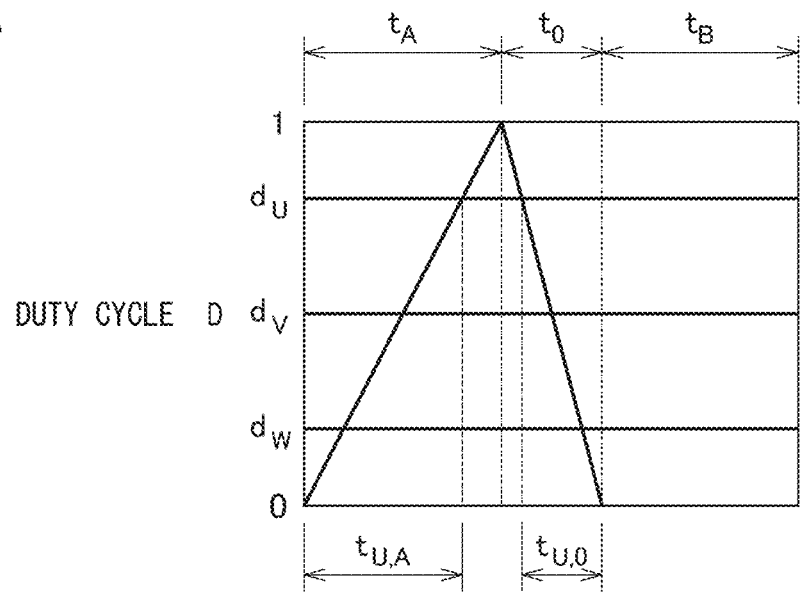
FIGS. 21A and 21B show a carrier signal and a U-phase voltage waveform of the converter according to method 1.

FIG. 21A shows a carrier signal of the converter according to method 1.

Figure 21B:
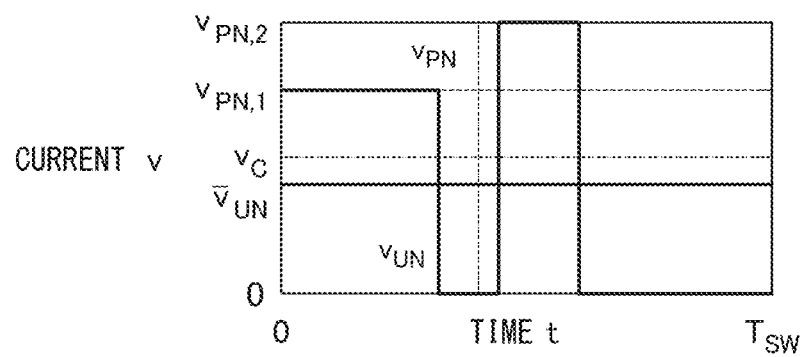

FIG. 21B shows a U-phase voltage waveform of the converter according to method 1.

The advantage of method 1 is that the same duty as used in the related art can be used. In other words, $$t_{U,A}=d_U \cdot T_A = d_U \cdot d_A \cdot T_{SW} \qquad (65)$$

$$t_{U,0}=d_U \cdot T_0 = d_U \cdot d_0 \cdot T_{SW} \qquad (66)$$

This shows that the average phase voltage is calculated as follows.

$$<v_{UN}> = v_{PN,1} \cdot t_{U,A}/T_{SW} + v_{PN,2} \cdot t_{U,0}/T_{SW}$$

$$= (2 \cdot v_C - |v_G|) \cdot d_U \cdot d_A + 2 \cdot v_C \cdot d_U \cdot d_0$$

$$= <v_{PN}> \cdot d_U \qquad (67)$$

(Method 2)

Method 2 integrates switching in the shoot through period ($t_B = d_B \cdot T_{SW}$).

In the related-art switching sequence, a dead time period is provided in which, before one of the half bridges is turned on, the other is invariably turned off.

In method 2, a shoot through period $t_{SH}$, in which both half bridges are turned on, is provided in the dead time period. In other words, the shoot through period is integrated into the switching sequence. Therefore, the number of times of switching is not increased.

The upper and lower duties $d_H$, $d_L$ of the half bridge meet the following relationship.

$$d_H = d_L + d_{SH} \qquad (68)$$

The shoot through period ($t_B = d_B \cdot T_{SW}$) is proportionally distributed in the active mode and the step-down mode as given below.

$$t_{B,A} = d_{B,A} \cdot T_{SW} = d_B \cdot d_A/(d_A + d_0) \cdot T_{SW} \qquad (69)$$

$$t_{B,0} = d_{B,0} \cdot T_{SW} = d_B \cdot d_0/(d_A + d_0) \cdot T_{SW} \qquad (70)$$

Further, the following holds $$t_{AN} = d_{AN} \cdot T_{SW} = (d_A + d_{B,A}) \cdot T_{SW} \qquad (71)$$

$$t_{0N} = d_{0N} \cdot T_{SW} = (d_A + d_{B,0}) \cdot T_{SW} \qquad (72)$$

$$t_{AN} + t_{0N} = 1 \qquad (73)$$

Based on these, the following is obtained.

$$d_{AN} = d_A + t_{B,A}/T_{SW} = d_A/(1-d_B) \qquad (74)$$

$$d_{0N} = d_A + t_{B,0}/T_{SW} = d_0/(1-d_B) \qquad (75)$$

A dual shoot through period is distributed between the active mode and the step-down mode in each of the phases (i.e., the three phases of U, V, W). In other words, $$t_{SH,A} = (1/3) \cdot t_{B,A} \qquad (76)$$

$$t_{SH,0} = (1/3) \cdot t_{B,0} \qquad (77)$$

First, an asymmetrical PWM carrier waveform as follows is obtained.

During the active mode ($t_{A,N} = d_{AN} \cdot T_{SW}$): changes from 0 to 1

During the step-down mode ($t_{0,N} = d_{0N} \cdot T_{SW}$): changes from 0 to 1

The step-up mode (shoot through) ($t_B = d_B \cdot T_{SW}$): maintained at 0

This allows the shoot through periods $t_{SH,A}$ and $t_{SH,0}$ are capable of realizing a difference in duty cycle $t_{SH} = (1/3) \cdot d_B$ between the duty $d_{x,H}$ of the high-side switch of each half bridge $x \in \{a, b, c\}$ and the duty $d_{x,L}$ of the low-side switch.

$$d_{x,H} = d_{x,L} + (1/3) \cdot d_{B,x} \qquad (78)$$

where $x \in \{a, b, c\}$

A half-bridge output $d_a$ at the minimum duty, a half-bridge output $d_b$ at the intermediate duty, and a half-bridge output $d_c$ at the maximum duty are as follows.

$$d_a = \min(d_U, d_V, d_W) \qquad (79)$$

$$d_b = \mathrm{mid}(d_U, d_V, d_W) \qquad (80)$$

$$d_c = \max(d_U, d_V, d_W) \qquad (81)$$

where min( ) means taking the minimum value in ( ), mid( ) means taking the intermediate value in ( ), and max( ) means taking the maximum value in ( ).

In order to calculate the duties $d_{x,H}$ and $d_{x,L}$ of the high and low side switches, the impact of the shoot through period in a given phase affects the on-time of the other phases should be considered. It should be noted that the DC link voltage is 0 (the output voltage is 0) during the shoot through period.

For this reason, the minimum duty $d_{a,L}$ of $d_U$, $d_V$, $d_W$ is obtained. Noting that $$d_{AN} = d_A + t_{B,A}/T_{SW} = d_A/d_{A,N} = 1 - d_B \qquad (82)$$

the duty can be obtained from the coefficient of $$d_A/d_{A,N} = 1 - d_B \qquad (83)$$

Accordingly, $$d_{a,L} = (1-d_B) \cdot d_a \qquad (84)$$

Further, the high-side duty $d_{a,H}$ is given by $$d_{a,H} = d_{a,L} + (1/3) \cdot d_B \qquad (85)$$

Figure 22A:
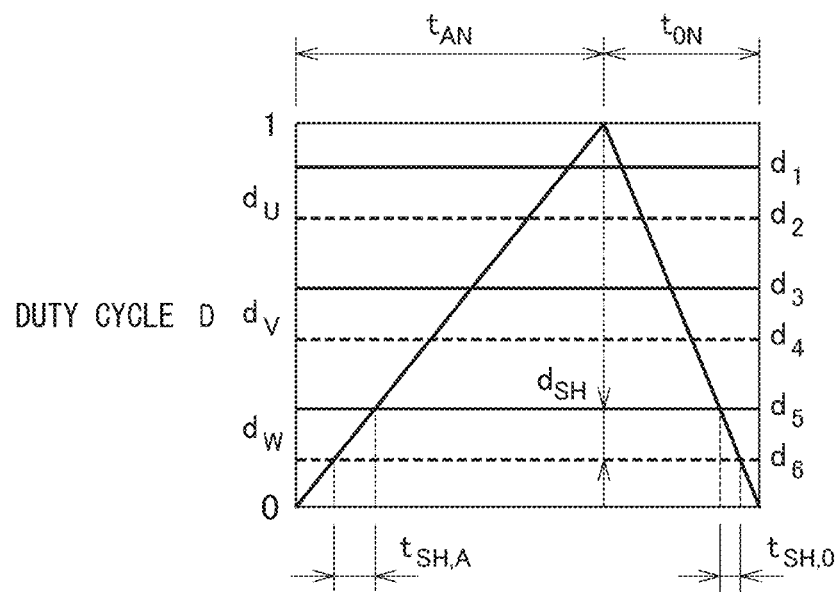
FIGS. 22A and 22B show a carrier signal and a U-phase voltage waveform of the converter according to method 2.

FIG. 22A shows a carrier signal of the converter according to method 2.

Figure 22B:
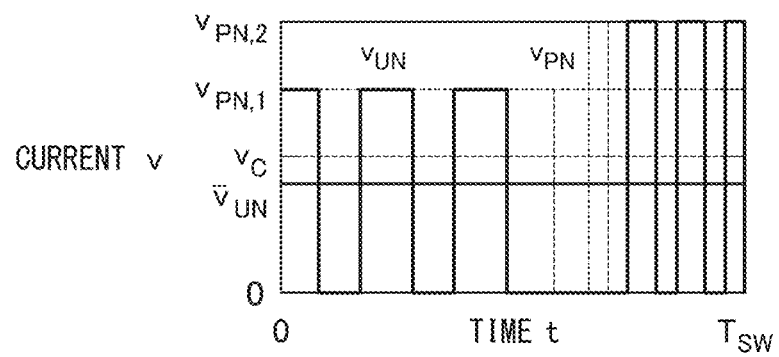

FIG. 22B shows a U-phase voltage waveform of the converter according to method 2.

Similarly, the duties of the high side and the low side in the second and third phases are calculated as follows, based on their relationship with the preceding phases.

$$d_{a,L} = (1-d_B) \cdot d_a \qquad (86)$$

$$d_{b,L} = d_{a,H} + (1-d_B) \cdot (d_b - d_a) \qquad (87)$$

$$d_{c,L} = d_{b,H} + (1-d_B) \cdot (d_c - d_b) \qquad (88)$$

As described above, the PWM carrier waveform of the switching signal is asymmetrical with respect to the time axis in this embodiment. This makes it possible to distribute the shoot through period properly. Accordingly, the current ripple in the inductor current of the Z source circuit can be reduced and the loss in the system as a whole can be minimized.

According to an embodiment of the present invention, the AC-AC converter circuit includes a control circuit that controls the step-down circuit and the inverter circuit. The step-down circuit includes a step-down circuit switching element. The inverter circuit includes an inverter circuit switching element. The control circuit uses, for control, a first operation mode in which the step-down circuit switching element is on and the inverter circuit switching element is off, a second operation mode in which the step-down circuit switching element is off and the inverter circuit switching element is off, and a third operation mode in which the inverter circuit switching element is on.

In a further embodiment of the present invention, denoting an input voltage by $v_G$, a capacitor voltage by $v_C$, an average output voltage by $v_{PN}$, and a modulation factor by $m = |v_G|/v_{PN}$, the control circuit performs control so that a duty $D_3$, a first parameter M, and a second parameter $\cos \varphi$ in the third operation mode meet the following expressions $M<2/\sqrt{3}$, $\cos \varphi<1$, and $$D_3 \geq 6M\cdot\cos \varphi/(4-3M\cdot\cos \varphi)\cdot(v_c/V_G)^2\cdot m$$

In a further embodiment of the present invention, the control circuit performs control so that the duty $D_3$ in the third operation mode meets the following expression $$D_3 = 6M\cdot\cos \varphi/(4-3M\cdot\cos \varphi)\cdot(v_c/V_G)^2\cdot m$$

In a further embodiment of the present invention, the PWM carrier waveform of the switching signal is asymmetrical with respect to the time axis.

What is claimed is:

1. An AC-AC converter circuit adapted to convert an AC voltage into a further AC voltage, wherein
a Z source circuit is provided between a rectifier circuit that rectifies the AC voltage and an inverter circuit that generates the further AC voltage,
a step-down circuit is provided between the rectifier circuit and the Z source circuit,
the AC-AC converter circuit further comprising:
a control circuit that controls the step-down circuit and the inverter circuit, wherein
the step-down circuit includes a step-down circuit switching element,
the inverter circuit includes an inverter circuit switching element, and
denoting an input voltage by vG,
the control circuit uses, for control,
a first operation mode in which the step-down circuit switching element is on and the inverter circuit switching element is off,
a second operation mode in which the step-down circuit switching element is off and the inverter circuit switching element is off, and
a third operation mode in which the inverter circuit switching element is on, and
uses, for control, the first operation mode, the second operation mode, and the third operation mode when the input voltage $v_G$ is near 0.

2. The AC-AC converter according to claim 1, wherein a T source circuit or a Γ source circuit is provided between the rectifier circuit and the inverter circuit in place of the Z source circuit.

3. The AC-AC converter according to claim 1, wherein the inverter circuit includes a first switching element and a second switching element connected in series, and
there is provided a period in which, when the first switching element is on to generate the further AC voltage, the second switching element is on.

4. The AC-AC converter according to claim 1, wherein denoting an input voltage by $v_G$, a capacitor voltage by $v_c$, an average output voltage by $v_{PN}$, and a modulation factor by $m=|v_G|/v_{PN}$,
the control circuit performs control so that a duty $D_{A,BB}$, a first parameter M, and a second parameter $\cos \varphi$ in the first operation mode in a step-up and step-down operation meet the following expressions $M<2/\sqrt{3}$, $\cos \varphi<1$, and $$D_{A,BB} \geq 6M\cdot\cos \varphi/(4-3M\cdot\cos \varphi)\cdot(v_c/V_G)^2\cdot m.$$

5. The AC-AC converter according to claim 4, wherein the control circuit performs control so that the duty $D_{A,BB}$ in the first operation mode in the step-up and step-down operation meets the following expression $$D_{A,BB} \geq 6M\cdot\cos \varphi/(4-3M\cdot\cos \varphi)\cdot(vc/V_G)^2\cdot m.$$

6. The AC-AC converter according to claim 5, wherein a PWM carrier waveform of a switching signal is asymmetrical with respect to a time axis.

7. The AC-AC converter according to claim 4, wherein a PWM carrier waveform of a switching signal is asymmetrical with respect to a time axis.

* * * * *